(12) United States Patent
Johnston et al.

(10) Patent No.: US 8,219,522 B2
(45) Date of Patent: Jul. 10, 2012

(54) MANAGEMENT OF TEMPORAL DATA BY MEANS OF A CANONICAL SCHEMA

(75) Inventors: Thomas M. Johnston, Atlanta, GA (US); Randall James Weis, Lemont, IL (US)

(73) Assignee: Asserted Versioning, LLC, Atlanta, GA (US)

( * ) Notice: Subject to any disclaimer, the term of this patent is extended or adjusted under 35 U.S.C. 154(b) by 0 days.

(21) Appl. No.: 12/803,600

(22) Filed: Jun. 29, 2010

(65) Prior Publication Data

US 2011/0320419 A1   Dec. 29, 2011

(51) Int. Cl.
*G06F 17/30* (2006.01)
*G06F 17/00* (2006.01)
(52) U.S. Cl. .................. 707/609; 707/802; 707/803
(58) Field of Classification Search .................. 707/609, 707/802–803
See application file for complete search history.

(56) References Cited

U.S. PATENT DOCUMENTS 7,346,628 B2 * 3/2008 Porter ..................................... 1/1
7,734,659 B2 * 6/2010 Lori .............................. 707/802

OTHER PUBLICATIONS

"Archiving Scientific Data", ACM Transactions on Database Systems, vol. 29, No. 1, pp. 2-42, Mar. 2004, ACM.*
C. Njovu et al., "A Design Pattern Approach to Bitemporal Data Modelling", Proceedings of the 14th Int'l. Workshop on Database and Expert Systems Applications, 2003.*
Johnston et al; "Time and Time Again: Managing Time in Relational Databases, Part 1"; located at http://www.information-management.com/issues/20070501/1082475-1.html?zkPrintable=true; May 1, 2007; 6 pgs.
Johnston et al; "Time and Time Again: Managing Time in Relational Databases, Part 2—Preliminaries"; located at http://www.information-management.com/infodirect/20070504/1082693-1.html?zkPrintable=true; May 4, 2007; 8 pgs.
Johnston et al; Time and Time Again; Managing Time in Relational Databases, Part 3—Version Patterns 1 and 2; located at http://www.information-management.com/infodirect/20070518/1084145-1.html?zkPrintable=true; May 18, 2007; 8 pgs.
Johnston et al;Time and Time Again: Managing Time in Relational Databases, Part 4—Preliminaries to Version Pattern 3; located at http://www.information-management.com/infodirect/20070601/1085255-1.html?zkPrintable=true; Jun. 1, 2007; 7 pgs.

(Continued)

*Primary Examiner* — Yicun Wu
(74) *Attorney, Agent, or Firm* — Taylor English Duma LLP

(57) ABSTRACT

Computer programs embodied in computer-readable media for managing temporal data in relational databases are provided. According to one embodiment, a computer program comprises logic for storing temporal data in tables stored in a database and using a single schema. The schema includes a first column designating an identifier of an object represented in a row of a table and columns designating an effective-time period. For a past effective-time period, the state of the object as it existed is described by atemporal data in the row. For a present effective-time period, the present state of the object is described. For a future effective-time period, the state of the object as it will exist is described by the atemporal data. Additional logic stores additional data in the tables, such as business data describing the state of the object.

18 Claims, 22 Drawing Sheets

OTHER PUBLICATIONS

Johnston et al; "Time and Time Again: Managing Time in Relational Databases, Part 5: Version Pattern 3"; located at http://www.information-managennent.com/infodirect/20070615/1086123-1.html?zkPrintable=true; Jun. 15, 2007; 9pgs.

Johnston et al; Time and Time Again: Managing Time in Relational Databases, Part 6: Version Pattern 4; located at http://www.information-management.com/infodirect/20070629/1087439-1.html?zkPrintable=true; Jun. 29, 2007; 7 pgs.

Johnston et al; Time and Time Again: Managing Time in Relational Databases, Part 7: Completing Version Pattern 4; located at http://www.information-management.com/infodirect/20070713/1088592-1.html?zkPrintable=true; Jul. 13, 2004; 6 pgs.

Johnston et al; "Time and Time Again: Managing Time in Relational Databases, Part 8: Version Pattern 5"; located at http://www.information-management.com/infodirect/20070803/1089849-1.html?zkPrintable=true; Aug. 3, 2007; 6 pgs.

Johnston et al; Time and Time Again: Managing Time in Relational Databases, Part 9: Completing Version Pattern 5;located at http://www.information-management.com/infodirect/20070817/1090937-1.html?zkPrintable=true; Aug. 17, 2007; 7 pgs.

Johnston et al; "Time and Time Again: Managing Time in Relational Databases, Part 10—Foreign Keys in Version Tables"; located at http://www.information-management.com/infodirect/20070907/1092319-1.html?zkPrintable=true; Sep. 7, 2007; 7 pgs.

Johnston et al; "Time and Time Again: Managing Time in Relational Databases, Part 11—Foreign Keys in Version Tables Continued"; located at http://www.information-management.com/infodirect/20071005/10000163-1.html?zkPrintable=true; Oct. 5, 2007; 8 pgs.

Johnston et al; "Time and Time Again: Managing Time in Relational Databases, Part 12—Foreign Keys in Version Tables"; located at http://www.information-management.com/infodirect/20071019/10000082-1.html?zkPrintable=true; Oct. 19, 2007; 10 pgs.

Johnston et al; "Time and Time Again: Managing Time in Relational Databases, Part 13—A Roadmap of the Rest of This Series"; located at http://www.information-management.com/infodirect/2007_45/10000273-1.html?zkPrintable=true; Jan. 9, 2007; 12 pgs.

Johnston et al; "Time and Time Again: Managing Time in Relational Databases, Part 14—Versioning with Surrogate Keys"; located at http://www.information-management.com/infodirect/2007_47/10000330-1.html?zk Printable=true; Nov. 30, 2007; 8 pgs.

Johnston et al; "Time and Time Again: Managing Time in Relational Databases, Part 15—For and Against Surrogate Keys"; located at http://www.information-management.com/infodirect/2007_48/10000383-1.html?zk Printable=true; Dec. 7, 2007; 7 pgs.

Johnston et al; Time and Time Again: Managing Time in Relational Databases, Part 16—Physical Implementation of Version Pattern 1; located at http://www.information-management.com/infodirect/2007_51/10000487-1.html?zkPrintable=true; Dec. 21, 2007; 5 pgs.

Johnston et al; Time and Time Again: Managing Time in Relational Databases, Part 17—Physical Implementation of Version Pattern 2; located at http://www.information-managennent.com/infodirect/2008_53/10000583-1.html?zkPrintable=true; Jan. 4, 2008; 5 pgs.

Johnston et al; Time and Time Again: Managing Time in Relational Databases, Part 18—Physical Implementation of Version Pattern 3; located at http://www.information-management.com/infodirect/2008_55/10000644-1.html?zkPrintable=true; Jan. 18, 2008; 5 pgs.

Johnston et al; "Time and Time Again: Managing Time in Relational Databases, Part 19—RI and Temporal RI"; located at http://www.information-management.com/infodirect/2008_57/10000746-1.html?zkPrintable=true; Feb. 1, 2008; 7 pgs.

Johnston et al; Time and Time Again: Managing Time in Relational Databases, Part 20—RI and Temporal RI (Continued)"; located at http://www.information-management.com/infodirect/2008_59/10000793-1.html?zkPrintable=true; Feb. 15, 2008; 8 pgs.

Johnston et al; "Time and Time Again: Managing Time in Relational Databases, Part 21—Enforcement Time Options for Temporal RI"; located at http://www.information-management.com/infodirect/2008_62/10000912-1.html?zkPrintable=true; Mar. 7, 2008; 6 pgs.

Johnston et al; "Time and Time Again: Managing Time in Relational Databases—Part 22: Original and Temporal Deletes:"; located at http://www.information-management.com/infodirect/2008_64/10000972-1.html?zkPrintable=true; Mar. 21, 2008; 7 pgs.

Johnston et al; "Time and Time Again: Managing Time in Relational Databases, Part 23—Original and Temporal Updates"; located at http://www.information-management.com/infodirect/2008_66/10001077-1.html?zkPrintable=true; Apr. 4, 2008; 6 pgs.

Johnston et al; "Time and Time Again: Managing Time in Relational Databases, Part 24: Original and Temporal Updates (Concluded)"; located at http://www.information-management.com/infodirect/2008_68/10001130-1.html?zkPrintable=true; Apr. 18, 2008; 6 pgs.

Johnston et al; "Time and Time Again: Managing Time in Relational Databases, Part 25—Original and Temporal Inserts"; located at http://www.information-management.com/infodirect/2008_70/10001237-1.html?zkPrintable=true; May 2, 2008; 7 pgs.

Johnston et al; "Time and Time Again: Managing Time in Relational Databases, Part 26: Points in Time and Periods of Time"; located at http://www.information-management.com/infodirect/2008_72/10001287-1.html?zkPrintable=true; May 16, 2008; 6 pgs.

Johnston et al; "Time and Time Again: Managing Time in Relational Databases, Part 27—Original and Temporal Inserts (Concluded)"; located at http://www.information-management.com/infodirect/2008_75/10001385-1.html?zkPrintable=true; Jun. 6, 2008; 8 pgs.

Johnston et al; "Time and Time Again: Managing Time in Relational Databases, Part 28—A Revised Roadmap"; located at http://www.information-management.com/infodirect/2008_77/10001487-1.html?zkPrintable=true; Jun. 20, 2008; 5 pgs.

Johnston et al; "Time and Time Again: Scenario 1"; located at http://www.information-management.com/news/10002176-1.html?zkPrintable=true; Nov. 5, 2008; 7 pgs.

Johnston et al; "Time and Time Again: Scenario 1, Transaction 2"; located at http://www.information-management.com/news/-10002233-1.html?zkPrintable=true; Nov. 19, 2008; 5 pgs.

Johnston et al; "Time and Time Again: Scenario 1, Transaction 3"; located at http://www.information-management.com/news/10002276-1.html?zkPrintable=true; Dec. 3, 2008; 7 pgs.

Johnston et al; "Time and Time Again: Scenario 1, Transaction 4"; located at http://www.information-management.com/news/10002326-1.html?zkPrintable=true; Dec. 17, 2008; 6 pgs.

Johnston et al; "Time and Time Again: Where We're Going: Themes"; located at http://www.information-management.com/news/10001620-1.html?zkPrintable=true; Jul. 2, 2008; 5 pgs.

Johnston et al; "Time and Time Again: Managing Time in Relational Databases"—A Revised Roadmap; located at http://www.information-management.com/news/10001689-1html?zkPrintable=true; Jul. 16, 2008; 7 pgs.

Johnston et al; "Time and Time Again: The Importance of Bi-Temporal Data Management"; located at http://www.information-management.com/news/10001751-1.html?zkPrintable=true; Jul. 30, 2008; 6 pgs.

Johnston et al "Time and Time Again: Concluding Our Extended Taxonomy Discussion"; located at http://www.information-management.com/news/10001807-1.html?zkPrintable=true; Aug. 13, 2008; 8 pgs.

Johnston et al; "Time and Time Again: Versions and Episodes"; located at http://www.information-management.com/news/10001901-1.html?zkPrintable=true; Sep. 3, 2008; 8 pgs.

Johnston et al; "Time and Time Again: The Origins of Asserted Versioning"; located at http://www.information-management.com/news/10001956-1.html?zkPrintable=true; Sep. 16, 2008; 5 pgs.

Johnston et al; "Time and Time Again: The Origins of Asserted Versioning"; located at http://www.information-management.com/news/10002021-1.html?zkPrintable=true; Oct. 1, 2008; 5 pgs.

Johnston et al; "Time and Time Again: The Logical Data Model for Asserted Versioning Examples"; located at http://www.information-management.com/news/10002073-1.html?zkPrintable=true; Oct. 15, 2008; 1 pg.

Johnston et al; "Time and Time Again: State Transformations"; located at http://www.information-management.com/news/10002357-html?zkPrintable=true; Jan. 2, 2009; 6 pgs.

Johnston et al; "Time and Time Again: Retroactive Updates"; located at http://www.information-management.com/news/10002381-1.html?zkPrintable=true; Jan. 14, 2009; 6 pgs.

Johnston et al; "Time and Time Again: Proactive Updates, Part 1"; located at http://www.information-management.com/news/10014843-1.html?zkPrintable=true; Feb. 6, 2009; 6 pgs.

Johnston et al; "Time and Time Again: Proactive Updates, Part 2"; located at http://www.information-management.com/news/10014984-1.html?zkPrintable=true; Feb. 18, 2009; 6 pgs.

Johnston et al; "Time and Time Again: Proactive Updates, Part 3"; located at http://www.information-management.com/news/proactive_update_asserted_versioning_time_and_time_again_closed_episode10015063-1.html?zkPrintable=true; Mar. 10, 2009; 5 pgs.

Johnston et al; "Time and Time Again: Proactive Updates, Part 4"; located at http://www.information-management.com/news/database_proactive_update_closed_episode_current_assertion_asserted_version-10015109-1.html?zkPrintable=true; Apr. 3, 2009; 6 pgs.

Johnston et al; "Time and Time Again:Merging Episodes"; located at http://www.information-management.com/news/merging_episodes-10015206-1.html?zkPrintable=true; Apr. 13, 2009; 6 pgs.

Johnston et al; "Time and Time Again: Splitting Episodes"; located at http://www.information-management.com/news/database_bitemporal_transaction_episode-10015374-1.html?zkPrintable=true; May 6, 2009; 4 pgs.

Johnston et al; "Time and Time Again: Splitting Episodes, Part 2"; located at http://www.information-management.com/news/split_episode_bitemporal_database-10015483-1.html?zkPrintable=true; May 22, 2009; 5 pgs.

Johnston et al; "Time and Time Again: Splitting Episodes, Part 3"; located at http://www.information-management.com/news/split_episode_bitemporal_database-10015564-1.html?zkPrintable=true; Jun. 5, 2009; 4 pgs.

\* cited by examiner

505

| tbl-nm | bus-key-col-nm |
|---|---|
| Client_AV | client_nbr |
| Policy_AV | policy_nbr |

507

| tbl-nm | fkey-col-nm | tfk-col-nm |
|---|---|---|
| Policy_AV | client_nbr | client_oid |

| oid | eff-beg-dt | eff-end-dt | asr-beg-dt | asr-end-dt | policy-nbr | *client-oid* | policy-type | copay-amt |
|---|---|---|---|---|---|---|---|---|
| 2117 | Mar10 | 9999 | Mar10 | May10 | P861 | 8094 | HMO | $15 |

Legend:
- Underlined column headings are primary key columns.
- Italicized column headings are temporal foreign keys.

701 EDIT TRANSACTION
703 SUPPLY TEMPORAL DEFAULTS
705 DEFINE TARGET SPACE
707 MATCH TO TARGET ROWS
709 SUPPLY OID
713 FOR EACH TFK: VALIDATE TRI
715 INSERT THE NEW ROW

| oid | eff-beg-dt | eff-end-dt | asr-beg-dt | asr-end-dt | policy-nbr | client-oid | policy-type | copay-amt |
|---|---|---|---|---|---|---|---|---|
| 2117 | Jan08 | Jul08 | Jan08 | 9999 | P861 | 8094 | HMO | $10 |
| 2117 | Jul08 | Jan09 | Jul08 | 9999 | P861 | 8094 | HMO | $15 |

FIG. 11

| oid | eff-beg-dt | eff-end-dt | asr-beg-dt | asr-end-dt | policy-nbr | client-oid | policy-type | copay-amt |
|---|---|---|---|---|---|---|---|---|
| 2117 | Jan08 | Jul08 | Jan08 | 9999 | P861 | 8094 | HMO | $10 |
| 2117 | Jul08 | Jan09 | Jul08 | 9999 | P861 | 8094 | HMO | $15 |
| 2117 | Mar10 | 9999 | Mar10 | 9999 | P861 | 8094 | PPO | $15 |

| oid | eff-beg-dt | eff-end-dt | asr-beg-dt | asr-end-dt | policy-nbr | *client-oid* | policy-type | copay-amt |
|---|---|---|---|---|---|---|---|---|
| 2117 | Jan08 | Jul08 | Jan08 | 9999 | P861 | 8094 | HMO | $10 |
| 2117 | Jul08 | Jan09 | Jul08 | 9999 | P861 | 8094 | HMO | $15 |
| 2117 | Mar10 | 9999 | Mar10 | Sep10 | P861 | 8094 | PPO | $15 |
| 2117 | Mar10 | Sep10 | Sep10 | 9999 | P861 | 8094 | PPO | $15 |
| 2117 | Sep10 | 9999 | Sep10 | 9999 | P861 | 8094 | PPO | $20 |

*FIG. 14*

| oid | eff-beg-dt | eff-end-dt | asr-beg-dt | asr-end-dt | client-nbr | client-nm |
|---|---|---|---|---|---|---|
| 8094 | Jan08 | 9999 | Jan08 | 9999 | C457 | Jones |

FIG. 16a

| oid | eff-beg-dt | eff-end-dt | asr-beg-dt | asr-end-dt | client-nbr | client-nm |
|---|---|---|---|---|---|---|
| 8094 | Jan08 | 9999 | Jan08 | Dec10 | C457 | Jones |
| 8094 | Jan08 | Jul10 | Dec10 | 9999 | C457 | Jones |
| 8094 | Nov10 | 9999 | Dec10 | 9999 | C457 | Jones |

FIG. 16b

| oid | eff-beg-dt | eff-end-dt | asr-beg-dt | asr-end-dt | policy-nbr | client-oid | policy-type | copay-amt |
|---|---|---|---|---|---|---|---|---|
| 2117 | Jan08 | Jul08 | Jan08 | 9999 | P861 | 8094 | HMO | $10 |
| 2117 | Jul08 | Jan09 | Jul08 | 9999 | P861 | 8094 | HMO | $15 |
| 2117 | Mar10 | 9999 | Mar10 | Sep10 | P861 | 8094 | PPO | $15 |
| 2117 | Mar10 | Sep10 | Sep10 | Dec10 | P861 | 8094 | PPO | $15 |
| 2117 | Sep10 | 9999 | Sep10 | Dec10 | P861 | 8094 | PPO | $20 |
| 2117 | Mar10 | Jul10 | Dec10 | 9999 | P861 | 8094 | PPO | $15 |
| 2117 | Nov10 | 9999 | Dec10 | 9999 | P861 | 8094 | PPO | $20 |

FIG. 16c

```
CREATE VIEW V_Policy_Uni_Temp_Txn_Time_Curr
AS SELECT oid, asr_beg_dt, asr_end_dt,
client_oid, policy_type, copay_amt
FROM Policy_AV
WHERE eff_beg_dt <= Now() AND eff_end_dt > Now()
```

FIG. 18

```
CREATE VIEW V_Policy_Uni_Temp_Valid_Time_Curr
AS SELECT oid, eff_beg_dt, eff_end_dt,
client_oid, policy_type, copay_amt
FROM Policy_AV
WHERE asr_beg_dt <= Now() AND asr_end_dt > Now()
```

FIG. 19

```
CREATE VIEW V_Client_Non_Temp_Curr
AS SELECT oid, client_nbr, client_nm
FROM Client_AV
WHERE asr_beg_dt <= Now() AND asr_end_dt > Now()
AND eff_beg_dt <= Now() AND eff_end_dt > Now()
```

*FIG. 20a*

```
CREATE VIEW V_Policy_Non_Temp_Curr
AS SELECT oid, client_oid, policy_type, copay_amt
FROM Policy_AV
WHERE asr_beg_dt <= Now() AND asr_end_dt > Now()
AND eff_beg_dt <= Now() AND eff_end_dt > Now()
```

*FIG. 20b*

```
CREATE VIEW Policy
AS SELECT policy_nbr AS P.policy_nbr,
      policy_type AS P.policy_type,
      copay_amt AS P.copay_amt,
      client_nbr AS C.client_nbr
FROM V_Policy_Non_Temp_Curr P
JOIN V_Client_Non_Temp_Curr C
ON C.client_oid = P.client_oid
```

*FIG. 21*

| oid | eff-beg-dt | eff-end-dt | asr-beg-dt | asr-end-dt | epis-beg-dt | policy-nbr | client-oid | policy-type | copay-amt |
|---|---|---|---|---|---|---|---|---|---|
| 2117 | Mar10 | 9999 | Mar10 | May10 | Mar10 | P861 | 8094 | HMO | $10 |

FIG. 23

| oid | eff-beg-dt | eff-end-dt | asr-beg-dt | asr-end-dt | epis-beg-dt | policy-nbr | client-oid | policy-type | copay-amt |
|---|---|---|---|---|---|---|---|---|---|
| 2117 | Jan08 | Jul08 | Jan08 | 9999 | Jan08 | P861 | 8094 | HMO | $10 |
| 2117 | Jul08 | Jan09 | Jul08 | 9999 | Jan08 | P861 | 8094 | HMO | $15 |

FIG. 24

| oid | eff-beg-dt | eff-end-dt | asr-beg-dt | asr-end-dt | epis-beg-dt | policy-nbr | client-oid | policy-type | copay-amt |
|---|---|---|---|---|---|---|---|---|---|
| 2117 | Jan08 | 9999 | Jan08 | 9999 | Jan08 | P861 | 8094 | HMO | $10 |
| 2117 | Jul08 | Jan09 | Jul08 | 9999 | Jan08 | P861 | 8094 | HMO | $15 |
| 2117 | Mar10 | 9999 | Mar10 | 9999 | Mar10 | P861 | 8094 | PPO | $15 |

FIG. 25

| oid | eff-beg-dt | eff-end-dt | asr-beg-dt | asr-end-dt | epis-beg-dt | policy-nbr | client-oid | policy-type | copay-amt |
|---|---|---|---|---|---|---|---|---|---|
| 2117 | Jan08 | Jul08 | Jan08 | 9999 | Jan08 | P861 | 8094 | HMO | $10 |
| 2117 | Jul08 | Jan09 | Jul08 | 9999 | Jan08 | P861 | 8094 | HMO | $15 |
| 2117 | Mar10 | 9999 | Mar10 | Sep10 | Mar10 | P861 | 8094 | PPO | $15 |
| 2117 | Mar10 | Sep10 | Sep10 | 9999 | Mar10 | P861 | 8094 | PPO | $15 |
| 2117 | Sep10 | 9999 | Sep10 | 9999 | Mar10 | P861 | 8094 | PPO | $20 |

FIG. 26

| oid | eff-beg-dt | eff-end-dt | asr-beg-dt | asr-end-dt | epis-beg-dt | policy-nbr | client-oid | policy-type | copay-amt |
|---|---|---|---|---|---|---|---|---|---|
| 2117 | Jan08 | Jul08 | Jan08 | 9999 | Jan08 | P861 | 8094 | HMO | $10 |
| 2117 | Jul08 | Jan09 | Jul08 | 9999 | Jan08 | P861 | 8094 | HMO | $15 |
| 2117 | Mar10 | 9999 | Mar10 | Sep10 | Mar10 | P861 | 8094 | PPO | $15 |
| 2117 | Mar10 | Sep10 | Sep10 | Dec10 | Mar10 | P861 | 8094 | PPO | $15 |
| 2117 | Sep10 | 9999 | Sep10 | Dec10 | Mar10 | P861 | 8094 | PPO | $20 |
| 2117 | Mar10 | Jun10 | Dec10 | 9999 | Mar10 | P861 | 8094 | PPO | $15 |
| 2117 | Nov10 | 9999 | Dec10 | 9999 | Nov10 | P861 | 8094 | PPO | $20 |

FIG. 27

| oid | eff-beg-dt | eff-end-dt | asr-beg-dt | asr-end-dt | policy-nbr | client-oid | policy-type | copay-amt | row-crt-dt |
|---|---|---|---|---|---|---|---|---|---|
| 2117 | Mar10 | 9999 | Mar10 | May10 | P861 | 8094 | HMO | $10 | Mar10 |

FIG. 28

| oid | eff-beg-dt | eff-end-dt | asr-beg-dt | asr-end-dt | client-nbr | client-nm | row-crt-dt |
|---|---|---|---|---|---|---|---|
| 8094 | Jun08 | Feb12 | Jun08 | 9999 | C457 | Jones | Jun08 |
| 8094 | Sep12 | 9999 | Mar12 | 9999 | C457 | Jones | Oct11 |

FIG. 30a

| oid | eff-beg-dt | eff-end-dt | asr-beg-dt | asr-end-dt | policy-nbr | client-oid | policy-type | copay-amt | row-crt-dt |
|---|---|---|---|---|---|---|---|---|---|
| 2117 | Jan11 | Jan12 | Jan11 | 9999 | P861 | 8094 | HMO | $20 | Jan11 |
| 2117 | Jan13 | Jan14 | Jul12 | 9999 | P861 | 8094 | PPO | $50 | Mar12 |

FIG. 30b

| oid | eff-beg-dt | eff-end-dt | asr-beg-dt | asr-end-dt | policy-nbr | client-oid | policy-type | copay-amt | row-crt-dt |
|---|---|---|---|---|---|---|---|---|---|
| 2117 | Jan11 | Jan12 | Jan11 | 9999 | P861 | 8094 | HMO | $20 | Jan11 |
| 2117 | Jan13 | Jan14 | Jul12 | Sep12 | P861 | 8094 | PPO | $50 | Mar12 |
| 2117 | Jan13 | Jun13 | Sep12 | 9999 | P861 | 8094 | PPO | $40 | May12 |
| 2117 | Jun13 | Jan14 | Sep12 | 9999 | P861 | 8094 | PPO | $50 | May12 |

*FIG. 31*

| oid | eff-beg-dt | eff-end-dt | asr-beg-dt | asr-end-dt | policy-nbr | client-oid | policy-type | copay-amt | row-crt-dt |
|---|---|---|---|---|---|---|---|---|---|
| 2117 | Jan11 | Jan12 | Jan11 | 9999 | P861 | 8094 | HMO | $20 | Jan11 |
| 2117 | Jan13 | Jan14 | Jul90 | 9999 | P861 | 8094 | PPO | $50 | Mar12 |

FIG. 32a

| oid | eff-beg-dt | eff-end-dt | asr-beg-dt | asr-end-dt | policy-nbr | client-oid | policy-type | copay-amt | row-crt-dt |
|---|---|---|---|---|---|---|---|---|---|
| 2117 | Jan11 | Jan12 | Jan11 | 9999 | P861 | 8094 | HMO | $20 | Jan11 |
| 2117 | Jan13 | Jan14 | Jul90 | Jul93 | P861 | 8094 | PPO | $50 | Mar12 |
| 2117 | Jan13 | Jun13 | Jul93 | 9999 | P861 | 8094 | PPO | $40 | May12 |
| 2117 | Jun13 | Jan14 | Jul93 | 9999 | P861 | 8094 | PPO | $50 | May12 |

FIG. 32b

| oid | eff-beg-dt | eff-end-dt | asr-beg-dt | asr-end-dt | policy-nbr | client-oid | policy-type | copay-amt | row-crt-dt |
|---|---|---|---|---|---|---|---|---|---|
| 2117 | Jan11 | Jan12 | Jan11 | 9999 | P861 | 8094 | HMO | $20 | Jan11 |
| 2117 | Jan13 | Jan14 | Jul90 | Jun12 | P861 | 8094 | PPO | $50 | Mar12 |
| 2117 | Jan13 | Jun13 | Jun12 | 9999 | P861 | 8094 | PPO | $40 | May12 |
| 2117 | Jun13 | Jan14 | Jun12 | 9999 | P861 | 8094 | PPO | $50 | May12 |

*FIG. 32c*

| oid | eff-beg-dt | eff-end-dt | asr-beg-dt | asr-end-dt | policy-nbr | client-oid | policy-type | copay-amt | row-crt-dt |
|---|---|---|---|---|---|---|---|---|---|
| 2117 | Jan11 | Jan12 | Jan11 | 9999 | P861 | 8094 | HMO | $20 | Jan11 |
| 2117 | Jan13 | Jan14 | Jun12 | 9999 | P861 | 8094 | PPO | $50 | Mar12 |
| 2117 | Jan13 | Jun13 | Jul93 | Jun12 | P861 | 8094 | PPO | $40 | May12 |
| 2117 | Jun13 | Jan14 | Jul93 | Jun12 | P861 | 8094 | PPO | $50 | May12 |

*FIG. 32d*

MANAGEMENT OF TEMPORAL DATA BY MEANS OF A CANONICAL SCHEMA

BACKGROUND

Temporal data is data that keeps track of changes over time. It is data, more precisely, that keeps track of changes along either one or two temporal dimensions.

One of these temporal dimensions is called "valid time" by computer scientists. In valid time, modifications to data in a database reflect changes happening in the world around us, and that we wish to keep track of. The second of these two temporal dimensions is called "transaction time" by computer scientists. Transaction time keeps track of when data is initially entered into a database. But in addition, transaction time keeps track of modifications to data in a database that do not reflect anything that is happening in the world around us. Instead, these modifications are made to adjust the data in some way, independent of what is happening to what the data represents. For the most part, these adjustments are made to correct mistakes found in the data.

Attempts to manage temporal data that varies in valid time may be found in many business applications. Research into temporal data that varies in both valid time and transaction time has been ongoing in the computer science community for several decades. Although there is still no de jure SQL standard for managing temporal data, DBMS vendors have begun to add support for temporal data to their DBMSs and related products.

FIELD OF THE INVENTION

This is an invention related to the management of temporal data in relational databases.

BACKGROUND AND INTRODUCTION TO THE INVENTION

Before proceeding, we will introduce some needed terminology. We prefix most of our definitions of terms with "(def)".

(def) temporal data: data that keeps track of changes over time.

(def) temporal table: a table that contains temporal data.

(def) temporal database: a database that contains at least one temporal table.

(def) temporal dimension: a semantic interpretation given to points in time and periods of time. Points in time and periods of time that belong to different temporal dimensions cannot be compared; they are incommensurable. Points in time and periods of time in the same temporal dimension can be compared as to their relative positions along the timeline which that temporal dimension interprets. For example, one time period may end before another time period begins, or may overlap that other time period, or may be contained within that other time period, or may end at the same time as that other time period, and so on.

(def) non-temporal table, conventional table: a non-temporal table, which we will also call a "conventional table", is a table whose rows stand for statements about what we currently assert the things those rows represent are currently like. Each row describes what the object it represents is currently like; in other words, it describes the current state of that object. Also, by its presence in the table, each row represents the assertion that the statement made by that row is true. If we believed that the statement were not true, we would remove the row from the table.

In a conventional table, anything that is represented by a row in that table is represented by only one row. A conventional table contains no history about the things which its rows represent. It does not contain any history about erroneous data that was later corrected. It also contains no data about the future, i.e. about what the things its rows represent may be like at some future point in time.

(def) conventional database: a database all of whose tables are conventional tables.

(def) object: anything that can be distinguished from other instances of its type, and that can change over time. So, for example, specific customers, products, employees and invoices are all objects. A relationship represented by a row in an associative table, such as a table relating customers to salespersons, is also an object. An event is not an object, because once an event has taken place, it is over and cannot change.

(def) type of object: the kind of thing something is. A type of object is represented, in a database, by a table. Each instance of that type is represented, in a conventional database, by a row in that table.

(def) statement: a description of something. In a natural language, a statement is made by writing or uttering a declarative sentence in a "normal" context, i.e. a context in which it is understood that by writing or uttering that sentence, one is also willing to affirm that what it says is true.

Each row in a table makes a statement about the object it represents. For example, consider a row in a non-temporal table of customers, where the columns of the table consist of a customer number primary key, a customer last name, and a customer status code, and the row consists of the values, respectively, "C123", "Jones" and "VIP". This row makes the statement "There exists a customer with customer number 'C 123', last name 'Jones' and status code 'VIP'". The presence of this row in its non-temporal table is the assertion that this statement is true.

(def) uni-temporal data: data that tracks changes in one and only one of the two temporal dimensions.

(def) valid time, effective time: the temporal dimension that computer scientists call "valid time", we will call "effective time". As stated above, in valid time, modifications to data in a database reflect changes happening in the world around us, and that we wish to keep track of.

(def) uni-temporal version data, uni-temporal version table: uni-temporal data that tracks changes in effective time we will call "uni-temporal version data", and we will call temporal tables that contain such data "uni-temporal version tables".

(def) version: a row in a uni-temporal version table is a version of the object it represents. Sometimes, we will use the word "versioned" instead of "version" in these expressions.

(def) transaction time, assertion time: the temporal dimension that computer scientists call "transaction time" is semantically a proper subset of the temporal dimension that we will call "assertion time". As stated above, in transaction time, modifications to data in a database do not reflect anything that is happening in the world around us. Instead, these modifications are made to adjust the data in some way, usually in order to correct mistakes found in the data. We allow data to be associated with future periods of assertion time, and it is this association which extends the semantics of assertion time beyond the semantics of transaction time. But except in this context, we do not allow data to be associated with future periods of assertion time. When we do not, "assertion time" and "transaction time" are equivalent terms; all instances of the one are instances of the other. See also the later section entitled Fundamental Concepts: Transaction Time and Assertion Time.

(def) uni-temporal assertion data, uni-temporal assertion tables: uni-temporal data that tracks changes in assertion time we will call "uni-temporal assertion data", and we will call temporal tables that contain such data "uni-temporal assertion tables".

(def) assertion: a claim that a statement is true. A row in a uni-temporal assertion table is an assertion of the statement made by that row, about the object it represents.

In the phrases "uni-temporal version" and "uni-temporal assertion", "uni-temporal" may be unnecessary, and so we may sometimes drop it.

(def) bi-temporal data, bi-temporal table: data that tracks changes in both temporal dimensions. We will call tables that contain bi-temporal data "bi-temporal tables". Rows in bi-temporal tables are both versions and assertions.

bitemporal, bi-temporal: we note that, in the prior art, the term "bitemporal" is sometimes used instead of the term "bi-temporal".

We proceed now to a review of the prior art.

2000: Developing Time-Oriented Database Applications in SQL.

R. T. Snodgrass. *Developing Time-Oriented Database Applications in SQL* (Morgan-Kaufmann, 2000).

This book, written by the leading researcher in the field of temporal data management, explains how to support temporal data management using Database Management Systems (DBMSs) and SQL current at the time of publication of the book. It describes an implementation of the basic concepts of temporal data management, an implementation which includes three kinds of temporal table. The first kind is called a "valid-time state table", and is the way that the invention described in this book manages temporal data which keeps track of changes in valid time. The second kind is called a "transaction-time state table", and is the way that the invention described in this book manages temporal data which keeps track of changes in transaction time. The third kind is called a "bitemporal table", and is the way that the invention described in this book manages temporal data which keeps track of changes in both valid time and in transaction time.

This book is an invaluable source of SQL code fragments that illustrate the complexity of managing bi-temporal data and, in particular, that illustrate the complexity of writing entity integrity and referential integrity constraints against temporal data. It constitutes a reduction to then-current practice of the underlying concepts of temporal data management.

We will refer to these temporal concepts, and the reduction to practice as described in this book, as the "baseline model of temporal data management" (or, for short, the "baseline temporal model"). It constitutes the invention on which our own invention is claimed to be an improvement.

Our invention is an improvement on the baseline temporal model in several ways. First, our invention uses a single canonical schema to express all temporal data. This schema is a bi-temporal schema, and so all temporal tables in our invention are bi-temporal tables. In our invention, therefore, temporal data which changes only in valid time, or temporal data which changes only in transaction time, are not kept track of by means of tables with different schemas, tables which use only one of the two temporal dimensions. With our invention, either kind of uni-temporal data can be maintained as bi-temporal data for which one of the time periods is not specified on maintenance transactions and instead takes on a default value. With our invention, either kind of uni-temporal table can be manifested as a queryable object by defining a uni-temporal view on the underlying bi-temporal table.

Our invention, in contrast to the baseline temporal model, also enforces entity integrity and referential integrity constraints on temporal data at the time that data is being maintained. It does so by means of insert, update and delete transactions. Consequently, in contrast to the baseline temporal model, a temporal database maintained by our invention will never contain temporal data that violates these constraints.

Our invention, in contrast to the baseline temporal model, also provides a surrogate-valued unique identifier of the objects represented by rows in tables. This provides a common syntax for uniquely identifying those objects, which is the same in all temporal tables in the database. With this common syntax which, in our preferred embodiment is a single surrogate-valued column, the primary keys of all temporal tables will be syntactically identical. This syntactic identity of the primary keys of all temporal tables simplifies the program code required to manage all forms of temporal data.

Our invention, in contrast to the baseline temporal model, also expresses all temporal data requirements as metadata. It thereby avoids the need to express those requirements in relational logical data models, or in entity-relationship logical data models, or in physical data models. It replaces a design specification in data models with a declarative specification in metadata.

Our invention, in contrast to the baseline temporal model, also extends the concept of transaction time to cover data which exists in future transaction time. We call maintenance transactions that specify future transaction time "deferred transactions", and we call the rows that result from applying them to a temporal database "deferred assertions". With deferred assertions, we eliminate the need to maintain separate datasets of transactions which are not yet ready to be applied to their target tables.

2002: Temporal Data and the Relational Model.

C. J. Date, Hugh Darwen, Nikos Lorentzos. *Temporal Data and the Relational Model*. (Morgan-Kaufmann, 2002).

While the main focus of our patent application, and also of the baseline temporal model, is row-level management of bi-temporal data, the main focus of Date, Darwen and Lorentzos' book is row- and column-level management of uni-temporal data. While the main focus of our patent application, and of the baseline temporal model, is on implementing temporal data management with current DBMSs and current SQL, the main focus of this book is on describing language extensions that contain new operators for manipulating versioned data. On both these counts, then, this book is essentially orthogonal to this patent application. We include it here because of the prominence of its authors.

2004: Oracle 10g Flashback Queries and Workspace Manager.

Oracle 10g extended the flashback queries of Oracle 9i to retrieve all the versions of a row between two transaction times, and allowed tables and databases to be rolled back to a previous transaction time, discarding all changes after that time.

However, Oracle's 10g flashback queries, like Oracle's earlier 9i flashback queries, are queries based on restoring data as of a past point in time, and then rolling forward to a designated later point in time. Like 9i flashback queries, 10g flashback queries do not address the problems involved in creating and maintaining temporal data.

With 10g Workspace Manager, Oracle began to address the issues involved in creating and maintaining temporal data. The Oracle 10g Workspace Manager includes valid-time support, transaction-time support, support for bi-temporal tables, and support for referential integrity relationships between temporal tables.

Our invention, in contrast to this work, manages all temporal data with only one kind of temporal table, that being a bi-temporal table, and it provides a method of managing all temporal data in a single table for each type of object represented, e.g. of managing all temporal data about customers in one customer table. When this is not done, as it is not done in any of Oracle's products or patents or patent applications of which we are aware, then in order to respond to a query about specific objects, as data located in one or two temporal time periods describes those objects, it may be necessary to assemble, or "re-constitute" (to use Oracle's own terminology) the requested data out of a repository of "raw material". This process is, conceptually, the same as the decades-old process of re-constituting desired data by restoring a database backup, and then using a transaction log to roll forward to a desired point in time.

Our invention, in contrast to this work, also eliminates the need to manage datasets which are collections of transactions not yet ready to be applied to production database tables. Oracle's workspaces are precisely such collections of transactions, and they are managed as datasets which are distinct from the production tables to which those transactions are intended to later be applied.

2005: Database System that Provides for History-Enabled Tables.

United States Patent Application 20070130226

Filed: Dec. 1, 2005

This prior art describes techniques for history enabling a table in a database system so that past versions of rows of the history-enabled table are available for temporal querying. The table is history enabled by adding a start time column to the table and creating a separate history table for the historical data. The start time field's value in a row of the history-enabled table indicates when the contents of the row last changed. The rows of the history table are copies of rows of the history-enabled table that have been deleted or updated. The rows include end time fields whose values indicate when the row was updated or deleted.

This prior art describes the management of data by associating it with only one time period. But first of all, if this time period were clearly valid time, or clearly transaction time, then it would describe only a method of managing uni-temporal data, whereas our invention is a method of managing bi-temporal data which fully subsumes the management of uni-temporal data.

Secondly, however, this prior art does not distinguish changes to data which were made to reflect changes to the objects represented by rows in a table, from changes to data made to correct errors in that data. It thus fails to distinguish valid time from transaction time, simply using transaction time as its single temporal dimension. It does not support either temporal dimension because it indiscriminately supports both.

Also, even if this prior art did describe a method for managing a uni-temporal history of changes to a table, it does not describe any method for managing data which exists in future effective time, or data which exists in future assertion time.

2006: An IBM Insurance Application Architecture Certified Bi-Temporal Database.

This database, designed and implemented by one of the authors of this patent application (Weis) supports the management and querying of bi-temporal tables. However, to carry out any modification to those bi-temporal tables, each of the physical transactions required to complete the modification must be "hand-written". Thus a single modification, e.g. a request to extend the effective start date of an insurance policy back to the beginning of the calendar year, might easily require half-a-dozen or more physical transactions, submitted to the DBMS in a specific sequence, and constituting an atomic unit of work. Errors in writing sets of these transactions have occurred frequently even though only experienced DBAs and SQL coders are used to write these transactions.

Our invention, in contrast to this work, permits modifications to temporal data to be expressed as single insert, update or delete statements which we call "temporal transactions". Our Asserted Versioning Framework (or, for short, "AVF"), shown as 111 in FIG. 1, accepts these temporal transactions and translates them into the multiple physical insert, update and delete statements which carry out the modification. This eliminates the frequent errors which appear when temporal modifications must be hand-written as sets of physical transactions.

2007-2009: The "Time and Time Again" Series.

This is a bi-monthly series of articles written by the authors of this patent application (Johnston and Weis). The series began in the May 2007 issue of *DM Review* magazine (now *Information Management*), and ran continuously in *DM Direct* (now *Information Management Direct*), up to the time of our preliminary patent application which was filed on Jun. 24, 2009.

One of the implementations in this patent application introduces the concept of an episode as a managed object, i.e. as an abstract data type, defined and manipulated by our invention. Episodes are first discussed in this prior art in Part 4, published in June 2007. But this and later discussions of episodes in this series of articles describe episodes in the context of a single temporal dimension, not in the context of bi-temporality.

In particular, in Part 19 (February 2008), we do provide a clear statement that episodes are the parent managed objects in temporal referential integrity relationships. We say that temporal referential integrity "prevents a child row from being effective before or after the continuous time range of an episode of the parent object." This is a true statement about what the temporal referential constraint is, but nowhere in this series do we describe a process for implementing the constraint checking.

For these two reasons, we conclude that the use of episodes, in a bi-temporal context, to enforce temporal referential integrity is both novel and unobvious with reference to this prior art.

2008: Presentation Made to the Manhattan Erwin User's Group.

This is a presentation made on June 3$^{rd}$ to the ERwin User's Group in Manhattan. It contains no material not presented in the "Time and Time Again" prior art described above.

2009: Oracle 11g Workspace Manager.

The Oracle 11g Workspace Manager is Oracle's current implementation of support for the management of temporal data that is not yet ready to apply to a database. It is a way of supporting what we call "pending transactions".

(def) pending transactions: collections of transactions that have been written but not yet submitted to the DBMS to be applied to a database.

Oracle's workspaces are hierarchical collections of pending transactions which can be modified, by means of insert, update, and delete transactions, without modifying the table from which they may have been originally extracted, and to which they will eventually be applied if they are not discarded.

However, this method of managing pending transactions creates many problems of its own. In particular, by distributing temporal data across different kinds and instances of physical and logical datasets, it separates this category of temporal data from other uni-temporal or bi-temporal data which exists in database tables. Thus, once a workspace is approved as containing data that the business wishes to include in those tables, IT technical personnel must begin by manipulating those datasets, and must note and resolve any inconsistencies that may have been introduced into the data.

Only after this work has been done will those technical personnel be able to move the designated data into the appropriate database tables. The latency incurred between the approval of designated workspace data, and its availability to the business user as rows in production tables, may thus be a matter of hours or even days.

In our invention, all temporal data is contained in one place, that being the temporal database tables managed by this invention. This includes the results of immediately applying all database transactions instead of managing some transactions in separate datasets. Those results are stored as rows in those tables, but the rows which correspond to pending transactions are not accessible to normal queries until the future point in assertion time associated with them becomes current. In some cases, these pending transactions create and modify data that will not become current for perhaps decades or centuries. This data will never become current "by accident", i.e. by the mere passage of time. Instead, it will not become current unless and until it is explicitly approved to become current. Once approved, it is "moved up" from that decades or centuries from now period of assertion time, to a point in assertion time that may be only a few seconds from the present moment. This "move up" of this approved data is a matter of changing a date (or timestamp) on one or more rows already in the database table they belong to. Thus, once approved, the latency involved in changing the status of those rows to current data, accessible to normal queries, is a matter of seconds or milliseconds. Moreover, even prior to that approval, our invention makes it possible to retrieve that pending data, alone or in combination with other temporal data in the same production tables, using SQL queries that a business user can write.

Oracle's version tables are one kind of uni-temporal table. They are what we call uni-temporal assertion tables. Their valid-time tables are another kind of uni-temporal table, the kind we call uni-temporal version tables. Together with bi-temporal tables, this means that there are three categories of temporal table in Oracle databases that must be managed, even if we do not count workspaces of pending transactions. In our invention, all temporal data is managed in bi-temporal tables, and those bi-temporal tables share a common canonical schema, thereby simplifying the maintenance and querying of that data and those tables.

2009: Temporal Relational Database Management System.

United States Patent Application 20090248727

Filed: Dec. 2, 2008.

This patent application describes a method for managing changes in both data values and in database schemas. The basic approach is to store a history of changes in a transaction log in which each transaction is associated with points in time in several temporal dimensions, including valid time and transaction time. Then, whenever a query is submitted to the DBMS, the DBMS "re-constitutes" both the schemas which interpret the data values, and the data values themselves, from the transaction log. By specifying different points in time or periods of time in these queries, the DBMS is able to support bi-temporal data.

Our invention does not address the problem known as "schema evolution", and so does not attempt to manage changes to database schemas.

The method described in this patent application, of storing data values as transactions, and then producing result sets for queries by processing an appropriate subset of transactions in response to each query, is not used in our invention.

Instead, our invention stores the results of transactions in the tables they update, and therefore our invention does not have to dynamically "re-constitute" the data requested by a query. It stores the results of transactions whose data describes the past, present or future states of the objects represented by the data in those tables. In this way, it supports valid time. It also stores corrections to data already entered, but keeps a record of the corrected data also. In this way, it supports transaction time.

In one of our implementations, our invention also accepts transactions which would otherwise have to be stored and managed in what are usually called "batch files", "batch tables" or other collections of transactions which the business has written but is not yet ready to apply. By accepting these transactions as soon as they are written, and storing their results in the tables which are their targets, our invention eliminates the substantial costs of managing such collections of transactions. By associating the results of those transactions with a future period of time in the temporal dimension we call "assertion time" and which is a semantic extension of the temporal dimension which computer scientists call "transaction time", those results remain effectively invisible to normal queries, but will automatically become visible when enough time has passed that their transaction times become current.

BRIEF SUMMARY OF THE INVENTION

Our invention, which we call the "Asserted Versioning Framework" (or, for short, the "AVF"), is an improvement on the baseline model of temporal data management. The improvement consists in using a schema, i.e. a DBMS catalog entry which defines a table in a database, which is identical for all temporal tables, except for the business data in those tables. We call this schema a "canonical schema" for managing temporal data.

(def) canonical schema: the bi-temporal schema of this invention which is used for all temporal tables.

This schema is a bi-temporal schema, so the AVF does not have any physical uni-temporal tables to manage, thus simplifying its codebase. These tables replace conventional tables; they are not in addition to conventional tables, further simplifying the codebase of the AVF. Temporal transactions can specify only an effective-time period, so they appear to be doing only uni-temporal work. However, all rows already present in the target table when a temporal transaction is processed, and that are affected by that transaction, are copied and transformed into rows which appear to be entries in an internal "semantic logfile", even though they continue to reside in that same table. In this way, a bi-temporal history of modifications to the table is preserved, even though the temporal transactions appear to be specifying only uni-temporal modifications. Temporal transactions do not have to specify any time periods at all, in which case they appear to be modifying conventional, non-temporal tables.

From the point of view of queries, a uni-temporal table is a view on a bi-temporal table, one which includes only one of the two kinds of time periods present in the underlying table. From the point of view of queries, a conventional non-temporal table is a view on a bi-temporal table from which all columns specific to the canonical schema have been dropped, and which always presents only rows which are current in both temporal dimensions.

In one implementation, we define an extension to what computer scientists call "transaction time", and what we call "assertion time". This extension supports future time periods in this second temporal dimension. With this extension, our invention also eliminates the need to store, in either batch transaction datasets, or in "workspaces", or in other-named repositories of maintenance transactions, those transactions which their authors are not yet ready to apply to the database. Instead, with our invention, all transactions are immediately applied to the database. If we are not yet willing to claim that the rows of temporal data resulting from any of these transactions make a true statement about the objects they represent, we specify a future assertion-time period on the transaction, and the row or rows that are created by the transaction are assigned that future time period, and will not be interpreted as making true statements, or statements otherwise good enough to be used for their intended purposes, about the objects they represent unless or until that future time period becomes a current time period.

In another implementation, our invention also eliminates the need to express requirements for temporal data in a data model. Instead, those requirements are expressed in metadata, and it is from a combination of a non-temporal data model and that metadata that a temporal database is generated.

In a referential integrity relationship among temporal tables, while the child object is a single row, the parent object is a set of possibly many rows. In another implementation, our invention defines this set of possibly many rows as an abstract data type, and enforces temporal referential integrity by means of this new data type.

It is well-known that an important way to improve the performance of a search in an index is to begin the search as far down the tree structure of the index as possible. It is also well-known that one way to do this is to use match predicates as extensively as possible, since the node in the index tree at which direct matching stops and sequential searching begins will be the node located by the first range predicate used after all match predicates have been applied. In another implementation, this invention provides a mean for improving the search for data which is current in effective time or which is current in assertion time by utilizing match predicates that eliminates most data which is not current in those temporal dimensions.

From the point of view of the incremental amount of work required by technical personnel to manage temporal data, perhaps the most important distinction between this invention and the prior art is that this invention supports the full semantics of bi-temporal data—even extending that semantics, as Dr. Richard Snodgrass acknowledges—with a single type of table schema, and without requiring the deployment of any additional datasets either within production databases or outside them. If a database contains one non-temporal table of customer data, then with this invention, full bi-temporal support is extended to customer data by modifying that one table to include customer data from the past or the future in either or both of two temporal dimensions. With no additional tables or other datasets to manage, this method of supporting temporal data requires much less additional work on the part of technical personnel than does the prior art.

BRIEF DESCRIPTION OF THE DRAWINGS

FIG. 11: a sample Policy table prior to applying a temporal insert transaction.

FIG. 12: the sample Policy table after applying the temporal insert transaction.

FIG. 14: the sample Policy table after a temporal update transaction.

FIG. 16a: a sample Client table before a temporal delete transaction.

FIG. 16b: the sample Client table after a temporal delete transaction.

FIG. 16c: the sample Policy table after a cascaded temporal delete transaction.

FIG. 18: a SQL CREATE VIEW statement that dynamically presents, as a queryable object, the assertion-time (transaction time) history of data about all objects that are currently in effect (valid). This is an example of a uni-temporal assertion table manifested as a view over a temporal table.

FIG. 19: a SQL CREATE VIEW statement that dynamically presents, as a queryable object, rows representing all currently asserted (current in transaction time) statements about the effective-time (valid time) past, present or future states of the objects referred to by those statements. This is an example of a uni-temporal version table manifested as a view over a temporal table.

FIG. 20a: a SQL CREATE VIEW statement that dynamically presents, as a queryable object, rows representing all currently asserted (current in transaction time) and currently effective (current in valid time) statements about clients. This is an example of a non-temporal table manifested as a view over a temporal table.

FIG. 20b: a SQL CREATE VIEW statement that dynamically presents, as a queryable object, rows representing all currently asserted (current in transaction time) and currently effective (current in valid time) statements about policies. This is an example of a non-temporal table manifested as a view over a temporal table.

FIG. 21: a CREATE VIEW statement that dynamically presents, as a queryable object, the otherwise identical non-temporal Policy table corresponding to the temporal Policy table. This is the view that, provided over each temporal table, supports temporal upward compatibility for queries.

FIG. 23: the extended canonical schema 623. This is the extension of the canonical schema to record episodes.

FIG. 24: an extended canonical schema temporal table with the same contents as the canonical schema temporal table shown in FIG. 11.

FIG. 25: an extended canonical schema temporal table with the same contents as the canonical schema temporal table shown in FIG. 12, and resulting from applying the same temporal transaction as the one resulting in the table shown in FIG. 12.

FIG. 26: an extended canonical schema temporal table with the same contents as the canonical schema temporal table shown in FIG. 14, and resulting from applying the same temporal transaction as the one resulting in the table shown in FIG. 14.

FIG. 27: an extended canonical schema temporal table with the same contents as the canonical schema temporal table shown in FIG. 16c, and resulting from applying the same temporal transaction as the one resulting in the table shown in FIG. 16c.

FIG. 28: the deferred assertion canonical schema 624. This is the extension of the canonical schema to support deferred transactions and deferred assertions.

FIG. 30a: a sample Client table, using the deferred assertion canonical schema, showing a client with a seven-month gap in effectivity.

FIG. 30b: a sample Policy table, using the deferred assertion canonical schema, showing a deferred assertion created several months before it will become a current assertion, which will make the policy once again effective, after a lapse of one year.

FIG. 31: the same sample Policy table shown in FIG. 30b, showing the results of a temporal deferred update transaction.

FIG. 32a: a sample Policy table, identical to that shown in FIG. 30b, except that the deferred assertions exist in far future assertion time.

FIG. 32b: the same sample Policy table shown in FIG. 32a, showing the results of a temporal deferred update transaction.

FIG. 32c: the same sample Policy table shown in FIG. 32b, showing the results of moving the unlocked deferred assertions backwards into near future assertion time, and also moving the locked deferred assertions into negative assertion time so that they will never be asserted.

FIG. 32d: the same sample Policy table shown in FIG. 32c, showing the results of moving the locked deferred assertion backwards into near future assertion time, and also moving the unlocked deferred assertions into negative assertion time so that they will never be asserted.

Figure 1:
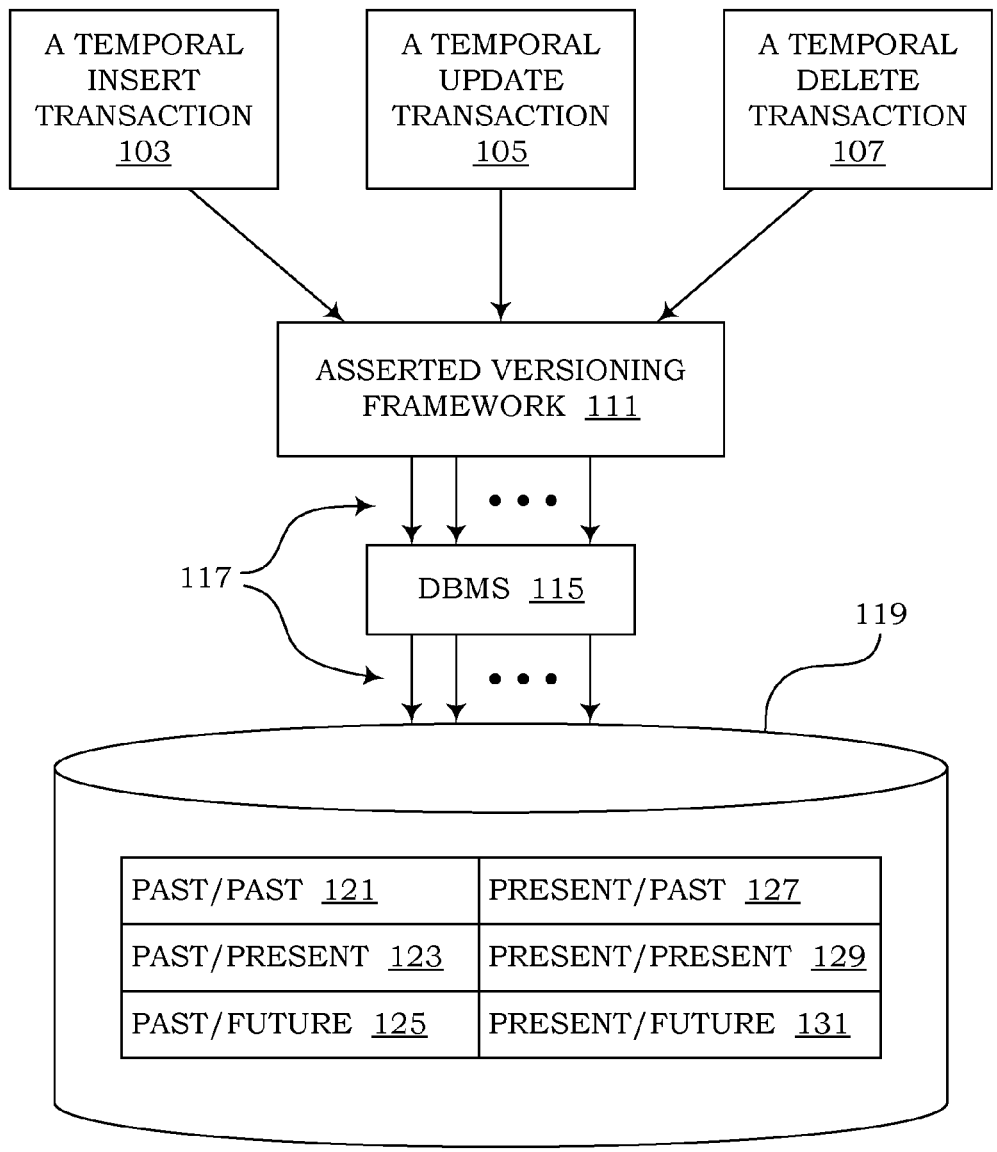
FIG. 1: the architectural context of the invention, in one embodiment, showing its role in translating an as-written insert 103, update 105 or delete 107 transaction against a canonical schema temporal table 119 into the possibly many physical transactions which the DBMS must apply to the database in order to complete the as-written transaction, and also showing the different categories of temporal data—121, 123, 125, 127, 129, 131—that reside in temporal tables.
Figure 2:
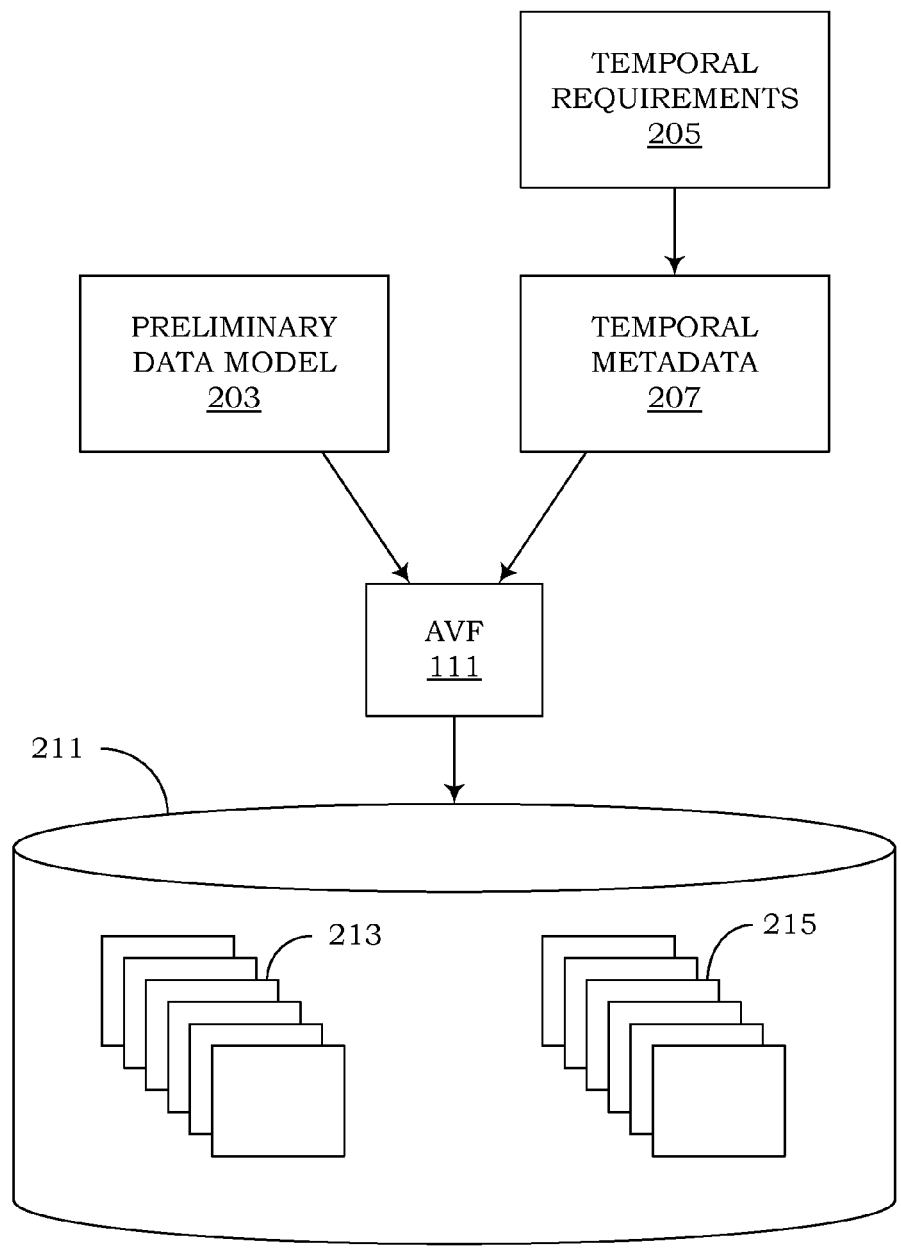
FIG. 2: a method for generating a temporal database 211 from a non-temporal data model 203, called a "preliminary data model", and temporal metadata 207. All temporal requirements are expressed in the metadata, and the invention uses that metadata, together with the preliminary data model, to generate a temporal database.

REFERENCE NUMERALS IN DRAWINGS 103 a temporal insert transaction
105 a temporal update transaction
107 a temporal delete transaction
111 the Asserted Versioning Framework
112 the deferred assertion Asserted Versioning Framework
115 a DBMS
117 transactions corresponding to one temporal transaction
119 a canonical schema temporal table
120 a deferred assertion canonical schema temporal table
121 past assertion time and past effective time
123 past assertion time and present effective time
125 past assertion time and future effective time
127 present assertion time and past effective time
129 present assertion time and present effective time
131 present assertion time and future effective time
133 future assertion time and past effective time
135 future assertion time and current effective time
137 future assertion time and future effective time
202 precursor table
203 preliminary data model
204 final temporal table
205 temporal requirements
207 temporal metadata
211 a temporal database
215 non-temporal tables
303 an otherwise identical non-temporal table
501 precursor table metadata
503 temporal foreign key metadata
505 business key metadata
507 foreign key to temporal foreign key mapping metadata
600 canonical schema common to all temporal tables
601 object identifier, OID
603 effective begin date
605 effective end date
607 assertion begin date
609 assertion end date
613 business key
615 temporal foreign key
617 business data 618 episode begin date
619 row create date
621 primary key=601+603+607
623 extended canonical schema
624 deferred assertion canonical schema
701 edit transaction
703 supply temporal defaults
705 define target space
707 match to target rows
709 supply OID
710 check for TRI blocks
713 for each TFK, validate TRI
715 insert the new row
753 withdraw rows partially inside target space
755 cut rows partially inside target space
757 replace cuts outside target space
759 supercede cuts inside target space
761 withdraw rows fully inside target space
763 supercede rows fully inside target space
769 recursively delete or set null TRI child rows

DETAILED DESCRIPTION OF THE INVENTION

We begin by providing prima facie evidence that our various embodiments are useful, novel and unobvious. A book we have written and which is soon to be published—*Managing Time in Relational Databases: How to Design, Update and Query Temporal Data* (Morgan-Kaufmann, 2010)—describes an invention which is the amalgamation of various embodiments in this patent application. An endorsement from Dr. Richard Snodgrass, the author of the TSQL proposals to the SQL standards committee, and a leading researcher in the field of managing temporal data, appears on the outside back cover of our book. This endorsement states that "The authors present an original and comprehensive conceptual approach called Asserted Versioning, which includes support for bi-temporality and is a significant advance in the theory and practice of managing time-varying data."

We have already introduced and defined several important concepts, including the concepts of temporal data, temporal tables, temporal databases, temporal dimensions, uni-temporal data, uni-temporal tables, uni-temporal assertion tables, uni-temporal version tables, bi-temporal data, bi-temporal tables, non-temporal (conventional) data, and non-temporal (conventional) tables. We will now define several additional concepts required by the following discussion of the invention, and also clarify the conventions we use to represent time periods. Then we describe the architectural context of this invention. We define what we call the "baseline model of temporal data management" (or, for short, the "baseline temporal model"). After those discussions, the remainder of this detailed description will be organized as a discussion of various embodiments.

Foundational Concepts: Production Tables.

(def) production table: a production table is where we keep data that we, the enterprise that creates and maintains that data, are willing to say is our best and most accurate data about the things the data represents. In production tables, as we will explain below, each row makes a statement that we are willing to assert is a true statement or, if a statement about the future state of an object, and as such a statement which we cannot yet assert as being either true or false, is nonetheless a statement on the basis of which business decisions may be made.

Unless otherwise indicated, all references to tables, including uni-temporal, bi-temporal and non-temporal tables, are first and foremost to production tables, and all references to databases, including to conventional and to temporal databases, are first and foremost to production databases. While this invention manages non-production tables as well as production tables, its principal business value lies in its management of production tables and production databases.

Foundational Concepts: Tables and Types, Rows and Instances, Columns and Properties or Relationships.

Types and instances are one of the most basic ways we organize knowledge. There are different types of things, and there are instances of each type. We will use the term "object" to refer to an instance of a type.

Tables in databases represent the types of things we are interested in—types such as clients, policies, employees, organizational structures, and so on. Rows in conventional tables represent instances of these types. These instances are the individual objects we are interested in—objects such as specific clients, specific policies, and so on.

Columns in these tables represent types of properties of objects, or types of relationships those objects have to other objects. In each row, each of its column instances represents the specific instance of that property type or of that relationship type which the object represented by that row has. For example, one health insurance policy may have a policy type of PPO, while another may have a policy type of HMO. One health insurance policy may have an "owned by" relationship to client C123, while another may be owned by client C789, and so on.

Foundational Concepts: Object Identification and Reference.

In the three canonical schema used by this invention—the canonical schema 600 (FIG. 9), the extended canonical schema 623 (FIG. 23), and the deferred assertion canonical schema 624 (FIG. 28)—an object is uniquely identified by means of an object identifier (OID) 601.

In a relational database, a referential integrity relationship between two non-temporal tables is implemented by means of a foreign key. A temporal referential integrity relationship between two temporal tables, as explained further in the section Fundamental Concepts: Temporal Referential Integrity, below, is implemented by means of a temporal foreign key 615. We will sometimes use the acronym "TRI" to stand for "temporal referential integrity", and will sometimes use the acronym "TFK" to stand for "temporal foreign key".

Foundational Concepts: Statements, Versions, and Assertions.

Statements are made by declarative sentences. In databases, each row in a table stands for what logicians call an existentially quantified statement. These are statements which can be expressed in English in the form "There exists an X such that . . . ". For example, "There exists a customer such that the last name of that customer is 'Jones'". As represented in a conventional customer table, this statement is true if and only if there is a row in the customer table with the value "Jones" in its last name column.

A version of an object may be thought of as a timeslice of the life history of an object. The timeslice is uniquely identified by designating an object and a period of time. For example, the statement "During the month of August 2010, there existed a customer such that the customer's last name was 'Jones'" is an existentially quantified statement about a version of an object.

Ignoring self-contradictory or otherwise nonsensical statements, all statements must be capable of having a truth value. Many statements actually do have truth values; that is, many statements are, in fact, true or false. But some statements, according to widely-accepted interpretations in logic, lack a truth value. On these interpretations, for example, the statement "The Atlanta Braves will win the 2028 World Series", as made now, and as made any time prior to the 2028 World Series, lacks a truth value.

This introduces the distinction between a statement and its assertion. With this distinction, we can say that an assertion is a claim that a statement is true.

In a conventional table, it is tacitly understood that by putting a row into a production table in a database, we are asserting that that row makes a true statement. For as long as that row remains in that table, we continue to assert as true the statement made by that row.

This is also true of rows which represent versions. Consider the row which represents the statement "During the month of August 2008, there existed a customer such that the customer's last name, at that time, was 'Jones'". For as long as that row remains currently asserted in a temporal table, we will assert that it makes a true statement, i.e. the statement that, throughout the month of August 2008, that customer's last name was "Jones".

But sometimes we discover, after the fact, that we were mistaken, and that certain rows do not make true statements. If we wish to retain the information that our tables did contain such mistakes, how will we indicate that? One way is to associate another time period with the rows in our tables. This time period will represent when we asserted, assert or will assert that a row makes a true statement. If that row is a row in a versioned table, then that row will have two time periods associated with it. The first time period will designate a period of time in the life history of the object represented by the row. The second time period will designate a period of time during which we once asserted, presently do assert, or may in the future come to assert, that the row makes a true statement.

(def) state: the state of an object is what the object is like at a point in time or during a period of time. In a conventional table, the state of an object is described by the business data on the one row representing that object. The point in time is understood to be the present moment. The period of time is understood to be an open time period, and so the row is understood to represent the current state of the object which will continue to be the state of the object unless or until the row is deleted or updated. In a table which supports valid time (effective time), rows representing different states of the same object may concurrently exist in the table, provided the table never contains more than one row which is currently asserted to describe the state of an object at any point in valid time (effective time).

Fundamental Concepts: Transaction Time and Assertion Time.

Valid time keeps track of changes to data which are made in order to keep up with changes to the objects represented by that data. Transaction time keeps track of when data was first placed in a table. But it also keeps track of changes to data which do not reflect changes to the objects represented by that data. It does so by associating a later period of transaction time to a row which represents the same object during all or part of the same period of valid time. In a series of such rows, the row with the latest transaction time is understood to contain correct data, and the other rows are understood to contain mistaken data.

This description of valid time and transaction time also applies to effective time and assertion time. We permit rows to be associated with future periods of assertion time, the difference between transaction time and assertion time is only one of interpretation. Transaction time is a physical description of this temporal dimension. Assertion time is a semantic description.

One can establish the correlation between the physical and the semantic description by realizing that every row in a table makes a statement which describes the state of some object during some period of time. In a conventional table, that state of the object is its current state, what it is like currently. The presence of a row in a conventional table is the assertion that the row makes a true statement. When the first temporal dimension is added to an otherwise conventional table, it remains true that the presence of a row in the table is the assertion that the row makes a true statement. But in this case, the true statements are statements about the past, present or future states of objects, not just the state they are in at the current moment in time.

But when the second temporal dimension is added, it is no longer true that each row in the table is asserted, or understood, to make a true statement. In a series of rows about the same object and the same first period of time, as described above, only the row whose second time period is a current time period is asserted, or understood, to make a true statement. The other rows are mistakes, and are understood to be mistakes, and so we are no longer willing to assert that they make true statements. Their second time period ends on the same clock tick that the row containing the corrected data begins.

This second time period changes what it means for a row to be present in a table. Without it, the presence of a row is the assertion that the row makes a true statement. With it, rows may remain in tables even though they no longer have the status of representing assertions of the truth of the statements they make.

Thus, until we consider the implementation that extends assertion time to include future assertion-time periods, transaction time and assertion time are equivalent, and will always be managed in the same way. The difference, at this point, lies solely in interpretation. As for valid time and effective time, the difference between them is purely terminological.

A Note on the Representation of Time Periods.

We begin with some necessary terminology.

(def) clock tick: a clock tick is the smallest unit of time that can be used for the begin date or end date of a time period. For example, if a date datatype is used for the begin dates and end dates, and the level of granularity chosen for time periods is that of one day, then two clock ticks are adjacent, and have no gaps between them, if and only if they represent successive days.

(def) time period: an interval of time with a known begin point in time.

(def) closed time period: a time period with a known end point in time.

(def) open time period: a time period with an unknown end point in time.

A clock tick designates a known position along a timeline. A time period always consists of at least one clock tick.

We use the "closed-open" convention for representing time periods with delimiting points in time. In this convention, the beginning point in time, which we call a "begin date", is included in the time period it delimits, but the ending point in time, which we call an "end date", is the next point in time after the last point in time included in the time period it delimits.

Thus, for example, using a calendar month level of granularity, an effective begin date of March 2010 and an effective end date of April 2010 represent a time period consisting of a single clock tick. To take another example, an effective begin date of March 2010 and an effective end date of August 2010 represent a "closed time period" lasting five months, those months being March, April, May, June and July of 2010. An effective begin date of March 2010 and an effective end date of 9999-"9999" representing the highest temporal value which a specific DBMS can recognize—represent an "open time period" of unknown duration.

In all the figures used in this patent application, we use a calendar month as our chosen level of granularity. Thus, the temporal columns which are part of our canonical schema show, as sample data, dates in the format "xxx99", where "xxx" stands for "Jan", "Feb" . . . "Dec", and indicates a month of the year, and "99" stands for a year in the current century. Thus, "May12" stands for the month of May 2012, and is the clock tick that comes immediately after the clock tick of "April12" and immediately before the clock tick of "June12". We use this form of abbreviation in order to fit sample rows of data across one line of a printed page. It is an artifact of this convention that dates in the last century, or in prior or later centuries, cannot be represented. This restriction is only an artifact, and is not part of this invention. More commonly, time periods in temporal databases would be defined at the timestamp level of granularity, or at least at the level of calendar days.

Foundational Concepts: Temporal Entity Integrity.

Temporal entity integrity is similar to the relational constraint of entity integrity. We will sometimes use the acronym "TEI" to stand for the phrase "temporal entity integrity".

However, while entity integrity is defined over non-temporal tables, we define TEI over temporal tables. Entity integrity is the constraint that no two rows concurrently present in a non-temporal table may represent the same object. It is usually enforced by associating each object with a unique identifier which is used as the primary key of the table, and then by enforcing a unique index over that primary key.

(def) TEI is the constraint that requires that a temporal database is always in a state in which no two rows in the same temporal table have the same unique object identifier in both shared assertion time and shared effective time. This unique object identifier is called an OID, and is defined below in the section Canonical Schema of the Invention.

(def) shared time: defined as follows. The assertion time that is shared among assertion-time periods AT1, AT2, . . . ATn is the assertion-time period consisting of all the clock ticks that are in AT1 and AT2, . . . and ATn. The effective time that is shared among effective-time periods ET1, ET2, . . . ETn is the effective-time period consisting of all the clock ticks that are in ET1 and ET2, . . . and ETn.

Semantically, a database in which there are no TEI violations is a database in which there is no point in time on which the database makes two or more assertions about the same object as that object was, is, or will be during the same point in effective time.

The means by which TEI is enforced is explained in the sections in which we discuss temporal insert, temporal update and temporal delete transactions.

Foundational Concepts: Temporal Referential Integrity.

A preliminary concept for temporal referential integrity must first be defined. It is the concept of existence dependency.

(def) existence dependency: an object X is existence-dependent on an object Y if and only if X cannot exist unless Y also exists. For example, a water molecule cannot exist without both hydrogen and oxygen atoms. An invoice cannot exist without a customer.

Both referential integrity and temporal referential integrity are relationships between pairs of tables. In both types of relationship, we will call the table referred to the "parent table", and the table referring to it the "child table". We will sometimes use the acronym "TRI" to stand for the phrase "temporal referential integrity".

TRI is similar to referential integrity. However, while referential integrity is defined over non-temporal tables, we define TRI over temporal tables. Referential integrity is the constraint that if a database contains a table representing the type of object of which X is an instance, and also contains a table representing the type of object of which Y is an instance, the types and the tables not necessarily distinct, then whenever the database contains a row representing X, it must also contain a row representing Y. The row representing X is called the "child row" in the relationship, and the row representing Y is called the "parent row".

(def) TRI is the constraint that requires that a temporal database is always in a state in which the value in every TFK matches the OID of every row in a set of one or more rows such that the assertion-time period of each row in the set is identical to or fully contains the assertion-time period of the row containing the TFK, and the logical union of the effective-time periods of each row in the set contains no gaps in effective time, and is identical to or fully contains the effective-time period of the row containing the TFK.

We also point out that while the "child" in a TRI relationship is a row, the "parent" is not a row. It is a set of one or more rows, as just defined.

Semantically, this results in a database in which, for any two objects between which there is an existence dependency, and for which there is a table representing the types to which the objects belong, the database will never assert the existence of the dependent object in a given period of effective time unless it also at the same time asserts the existence of the object it is dependent on in an effective-time period that is identical to or fully contains the effective-time period of the dependent object.

The means by which TRI is enforced is explained in the sections in which we discuss temporal insert, temporal update and temporal delete transactions.

Foundational Concepts: an Otherwise Identical Non-Temporal Table.

For every prior art valid time table, transaction time table or bi-temporal table, it is possible to define a corresponding otherwise identical non-temporal table. The correspondence is intuitively clear. The temporal table corresponds to the non-temporal table, but with the addition of one or two time periods.

In this invention, for every temporal table it is also possible to define a corresponding otherwise identical non-temporal table. But unlike the prior art, the temporal tables managed by this invention are all bi-temporal, and all conform to a common canonical schema. In addition, the temporal tables in this invention replace the primary key of the otherwise identical non-temporal table with a surrogate-valued object identifier, and retain the primary key column or columns of the otherwise identical non-temporal table as non-key columns. In addition, the temporal tables in this invention replace foreign keys in otherwise identical non-temporal tables with surrogate-valued temporal foreign keys. Consequently, the correspondence of a temporal table managed by this invention, and an otherwise identical non-temporal table, is less intuitively clear than it is in the prior art.

This correspondence may be demonstrated by describing how a temporal table managed by this invention can be mapped into its otherwise identical non-temporal table. We begin with the schema-level mapping.

Figure 17A:
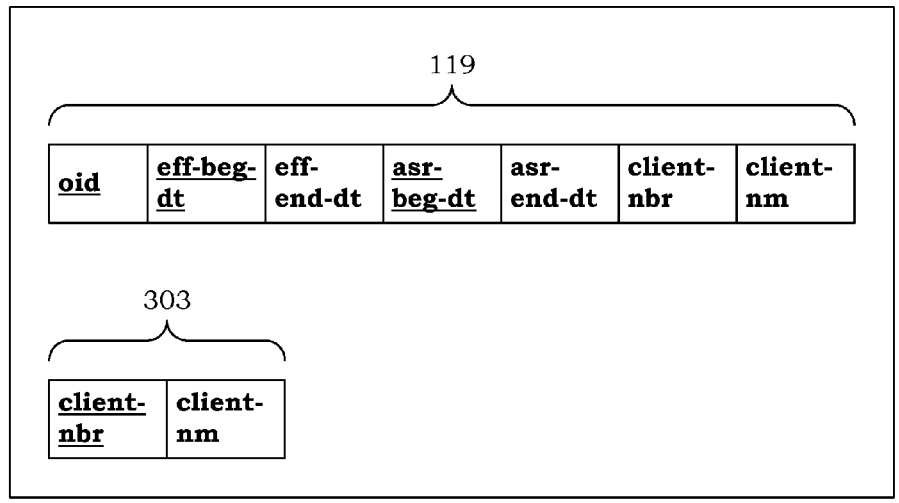
FIG. 17a: a canonical schema temporal table 119, and an otherwise identical non-temporal Client table 303.

FIG. 17a shows a temporal Client table 119 using the canonical schema 600 and an otherwise identical non-temporal Client table 303. We will describe a mapping from the temporal to the non-temporal table. First, we drop all columns that are part of the canonical schema used by the temporal table. These are the first five columns of the temporal table 119. Next, by means of metadata 505, we identify the column client-nbr as the primary key of the corresponding non-temporal table. Finally, because the column client-nm is not mentioned in any of the metadata 505-507, we identify it as a non-key column of the corresponding non-temporal table. All columns in the temporal table 119 have been accounted for, and the schema-level mapping for this table is complete.

Figure 17B:
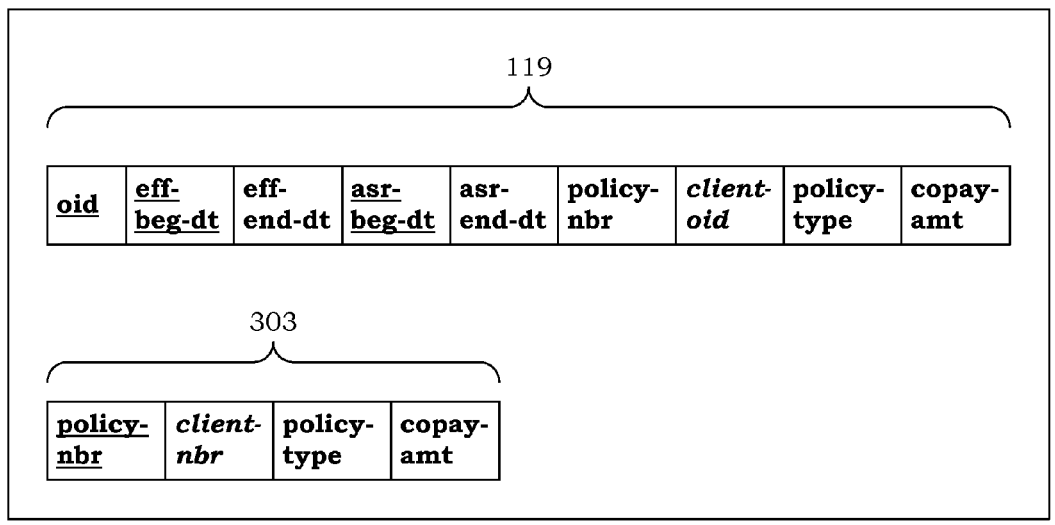
FIG. 17b: a canonical schema temporal table 119, and an otherwise identical non-temporal Policy table 303.

FIG. 17*b* shows a temporal Policy table 119 using the canonical schema 600 and an otherwise identical non-temporal Policy table 303. We will describe a mapping from the temporal to the non-temporal table. First, we drop all columns that are part of the canonical schema used by the temporal table. These are the first five columns of the temporal table 119. Next, by means of metadata 505, we identify the column policy-nbr as the primary key of the corresponding non-temporal table.

Then, by means of metadata 503, we identify the column client-oid as a temporal foreign key which references the Client table. This means that in the corresponding non-temporal table, there must be a foreign key which references the non-temporal Client table. By means of metadata 507, we know that the column name for that foreign key is client-nbr.

Finally, because the columns policy-type and copay-amt are not mentioned in any of the metadata 505-507, we identify them as non-key columns of the corresponding non-temporal table. All columns in the temporal table 119 have been accounted for, and the schema-level mapping for this table is complete.

But the equivalence of a temporal table and an otherwise identical non-temporal table must be an equivalence in content, and not just in schemas. In terms of content, only some of the rows in a temporal table have a corresponding row in their otherwise identical non-temporal table. Those are the rows whose assertion-time periods and effective-time periods are both current. Therefore, for all those rows, an otherwise identical non-temporal table (or view) can be populated by means of the following steps.

For each of those currently asserted and currently effective rows in the temporal table, the column or columns which metadata designates as the business key is used to populate the primary key column or columns of the non-temporal table. Next, for each temporal foreign key, if any, the row whose object identifier matches the value in the temporal foreign key, and whose assertion-time periods and effective-time periods are both current, is retrieved, and the column or columns making up the business key of that row are used to populate the column or columns making up the foreign key in the non-temporal table. Finally, for all other columns in the temporal table, their values are moved to the row in the non-temporal table.

The content-level mapping is now complete.

Architectural Context of the Invention.

FIG. 1 shows the architectural context of the invention. Reference characters 103, 105 and 107 designate temporal transactions.

(def) temporal insert transaction, temporal update transaction, temporal delete transaction: insert, update, or delete transactions, as written by their authors, and whose targets are temporal tables.

Reference character 111 designates the Asserted Versioning Framework, which we also refer to as the "AVF". It is the computer program code which is part of our invention, and which translates each temporal insert, update or delete transaction into one or more physical transactions which it then submits to a DBMS 115, which immediately applies those transactions to their target canonical schema temporal table 119.

canonical schema temporal table: a temporal table that uses the canonical schema 600.

(def) physical transaction: by a "physical transaction", we mean a SQL insert, update or delete transaction which the AVF submits to a DBMS.

The AVF manages each set of physical transactions corresponding to a single temporal transaction as an atomic and isolated unit of work. As these transactions update the database that contains the production tables, the AVF also enforces the semantic constraints specific to temporal data, those being the constraints of TEI and TRI.

Reference characters 121, 123, 125, 127, 129 and 131 represent the six categories of bi-temporal data recognized in the baseline temporal model. Using our terminology of "assertion time" and "effective time" instead of the standard computer science terminology of, respectively, "transaction time" and "valid time", each of the categories 121, 123, 125, 127, 129 and 131 are named by a pair of terms separated by a slash ("/"), in which the first term designates a time period in assertion time and the second term designates a time period in effective time. Thus, for example, the category named "past/future" 125, represents the category of bi-temporal data whose rows represent statements which we no longer assert to be true statements, and which are so designated by having assertion-time periods that have already ended. The statements represented by these rows are statements about future versions of the objects they each represent, i.e. statements about what the objects they each represent would be like at a specified future period of effective time.

Here and elsewhere, a period of time is designated as "past", "present" or "future" relative to the current moment in real time, i.e. relative to right now.

In an alternative embodiment, the AVF is incorporated into a DBMS. In that embodiment, the temporal transactions 103, 105 and 107 would be submitted directly to the DBMS 115.

The Baseline Model of Temporal Data Management.

The various embodiments in this patent application are for improvements over what we call the baseline model of temporal data management. We define this baseline model as consisting of the concepts and the reduction to practice expressed in [Snodgrass, 2000].

The Baseline Temporal Model Plus a Canonical Schema.

Our first embodiment is for a canonical schema used by all temporal tables in a temporal database managed by the AVF 111 and for a means by which requests to modify the data stored in these temporal tables can be satisfied.

Canonical Schema of the Invention.

Figures 9, 10:
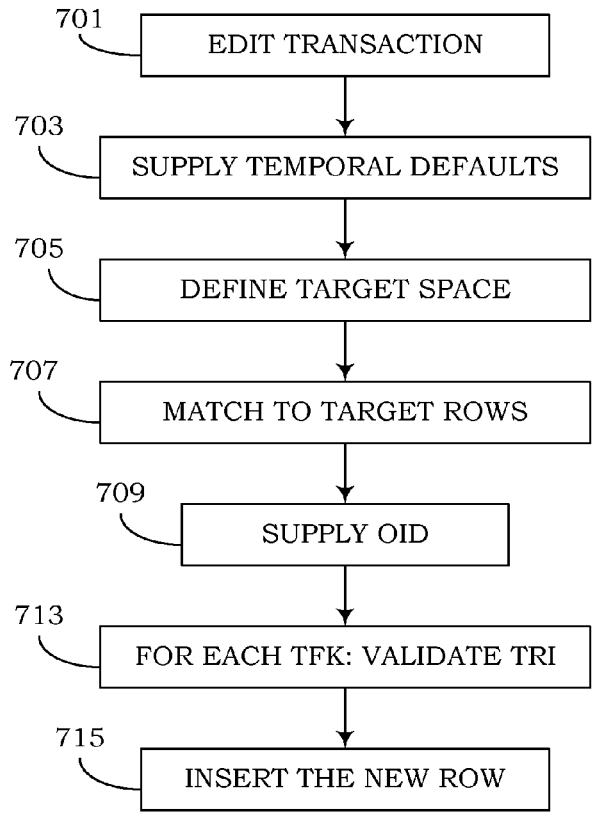
FIG. 9: the canonical schema 600 of the invention. All temporal tables using this canonical schema have columns 601-609, and all temporal tables use temporal foreign keys 615 to represent temporal referential integrity relationships.
FIG. 10: the sequence of steps for processing a temporal insert transaction.

Our first embodiment references "a schema common to all (the) temporal tables". This schema is the set of columns used by this invention to record and to manage all temporal data. In each table, there will be additional columns which represent the data specific to the kind of object represented by the table, data which we have called and will call "business data", and which are shown in FIG. 9 as the two columns 617. Thus, a customer table will have columns describing customers, a product table will have columns describing products, and so on. But if both tables are temporal tables, then both tables will use an identical set of columns to represent the temporal features of that data.

FIG. 9 shows the canonical schema 600 common to all temporal tables in temporal databases managed by this invention. Reference character 601 designates the object identifier, which we also refer to as the "OID".

(def) OID: a unique identifier for an object. In our preferred embodiment, it is a single surrogate-valued column. In another embodiment, the object identifier might consist of more than one column.

Whenever the AVF concludes that a temporal insert transaction contains data that describes an object that is not already represented by a row in the target table for that transaction, the AVF creates a new OID and attaches it to the transaction. Whenever the AVF concludes that a temporal insert transaction contains data that describes an object that is already represented by a row in the target table for that transaction, the AVF attaches the OID from that row in the target table to the transaction. In this way, to the extent permitted by the quality of the data on the transactions and in the database, the AVF insures that across all assertion time and all effective time, all rows representing the same object will have the same OID.

The temporal table shown in FIG. 9 is a table of health insurance policies. The sample row shown in FIG. 9 represents an insurance policy whose OID is 2117.

Effective-time periods and assertion-time periods are each represented, in our preferred embodiment, by a begin date and an end date. However, these "dates" might also be timestamps, or any other time-valued column of data. The dates used in all examples in this patent application are calendar months. In our notation, "May10" stands for the calendar month "May 2010". The month June 10 therefore comes right after the month May 10; there is no temporal gap between them. In another embodiment, a single column with a PERIOD datatype might be used instead to represent each time period. But because there is no consistent implementation of a PERIOD datatype across all the major commercial DBMSs available today, we use begin and end dates as our preferred embodiment of time periods.

Columns 603 and 605 are, respectively, the effective begin dates and effective end dates for this sample table. Columns 607 and 609 are, respectively, the assertion begin dates and assertion end dates for this sample table.

The sample row shown in FIG. 9 has an effective-time period of [March10-9999]. In this notation, which is also used for assertion-time periods, the first date within the brackets is a begin date and the second date is an end date. The statement made by this row describes what the object it represents is like beginning on March 2010, and what it will continue to be like unless or until the row is withdrawn. This follows from the fact that "9999" stands for the highest date the DBMS managing the database can recognize. Because it is the highest date, any date on or after March 2010 will be included in that period, and on any of those dates, this row will be current in effective time or, for short, "current in effect" or "currently effective".

(def) withdraw: to "withdraw" a row in a temporal table is to alter it so that it appears to reside in a "semantic logfile" which physically exists within the temporal table itself.

(def) semantic logfile: rows in a semantic logfile are all and only those rows no longer asserted to make true statements, and they are so designated by changing their assertion end dates to the date on which the assertion ceases to be made. Thus, a "semantic logfile" is not a physical structure within a temporal table. It is just the set of rows whose assertion end dates are in the past. It is the set of rows which, in FIG. 1, comprise all and only those rows in the categories 121, 123 and 125.

The sample row shown in FIG. 9 has an assertion-time period of [March10-May10]. This means that, in the months of March and April 2010, the statement made by this row was asserted to be a true statement describing what the object it represents was like, and was assumed to remain like unless or until other modifications are made to the database, during its effective-time period of [March10-9999]. It also means that, beginning in May 2010, the row was no longer asserted to make a true statement, and never again will be used to make a true statement. Beginning in May 2010, the row became part of that table's semantic logfile.

In a temporal table, the primary key of a row in that table consists of, semantically, a unique object identifier, an assertion-time period and an effective-time period. No two rows in a temporal table may have the same OID, identical or overlapping assertion-time periods, and identical or overlapping effective-time periods. Given this semantics of time periods as components of primary keys, and given our representation of time periods as pairs of dates, we represent time periods in the primary keys of temporal tables, in this embodiment, by using their begin dates only. Therefore, the primary key 621 of the canonical schema 600 is the combination of columns 601, 603 and 607.

By managing these pairs of dates as time periods, the AVF guarantees that we can represent a time period in a primary key by using just one of the dates that delimit the time period. For example, as far as the DBMS is concerned, the table shown in FIG. 9 could contain a second row which is identical to the row shown except that its effective begin date is August10. The values in the primary key columns of those two rows would be different, and so the DBMS would consider the primary key uniqueness constraint to be satisfied. However, the AVF would prevent that second row from being added to the table because the AVF would recognize that the two time periods [March10-9999] and [August10-9999] overlap. This overlap is a TEI violation.

Figures 6, 7, 8:
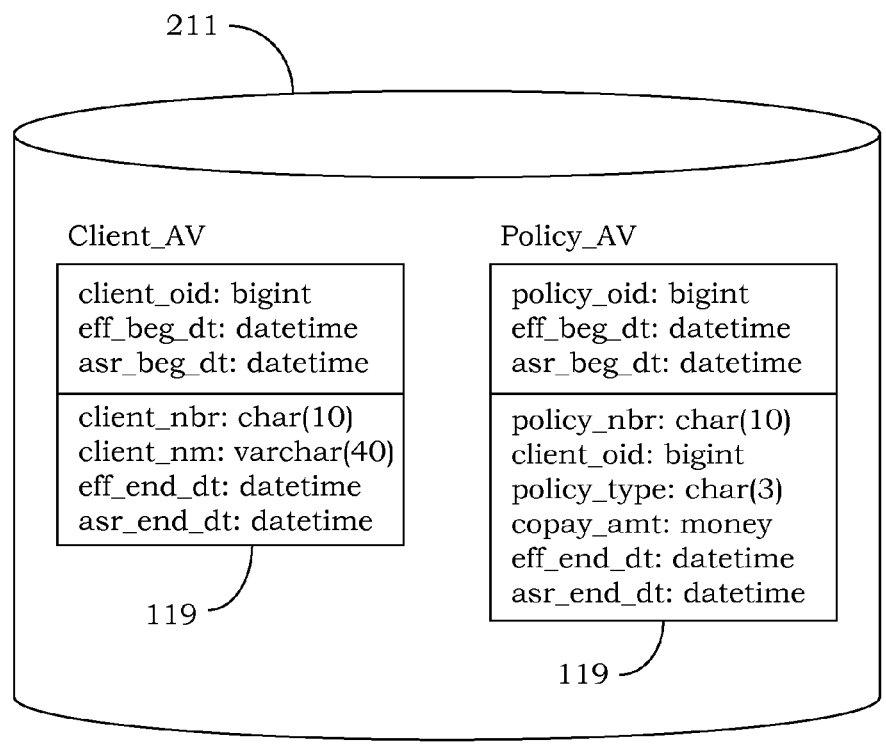
FIG. 6: business key metadata 505. Each row identifies one column of the business key for each temporal table. Each column corresponds, in sequence, to a column of the primary key of the precursor table from which the temporal table is generated.
FIG. 7: foreign key to temporal foreign key mapping metadata 507. Each row maps each temporal foreign key to the one or more columns that represent, in sequence, the corresponding conventional foreign key in the corresponding precursor table 202 in the preliminary data model 203.
FIG. 8: a temporal database 211. Shows the temporal database generated by the AVF 111 from the preliminary data model 203 and the metadata 501-507.

(def) business key: the non-key columns in a temporal table which correspond to the primary key columns of the precursor table corresponding to this temporal table. Column 613 is the business key of an object represented by a row in a temporal table. If the temporal table previously existed as a non-temporal table, it is also the primary key of that otherwise identical non-temporal table. The one or more columns making up the business key of a temporal table are identified by metadata 505, as shown in FIG. 6.

Column 615 is a TFK. As explained later in this description, by means of temporal foreign key metadata, shown as item 503 in FIG. 5, the AVF knows which temporal table is referenced by each TFK. The row of sample data in FIG. 9, which shows a Policy table, indicates that the insurance policy is related to, i.e. is owned by, a client whose OID is 8094. (The Client table referenced by this TFK is not shown.)

(def) business data: data which describes a property or a relationship of an object. In FIG. 9, the table shown also contains two columns of business data, indicates as items 617. The business data in the sample row in FIG. 9 says that the indicated insurance policy has a policy type of HMO and a copay amount of $15.

(def) atemporal data: data in a canonical schema other than the object identifier and the two time periods.

In our preferred embodiment, all temporal transactions are managed with Instead Of triggers. In this embodiment, any temporal update or temporal delete transaction may provide any selection criteria in a WHERE clause, and the AVF 111 will update or delete rows for as many objects as satisfy those selection criteria. The deferred assertion Asserted Versioning Framework AVF-D 112 (FIG. 29), described in another implementation, will do so also. In the following descriptions of how temporal transactions are processed, however, we will describe them as though only one object was specified on each transaction. Processing multiple objects in one transaction is simply a matter of the AVF 111 or the AVF-D 112 AVF looping through all objects until all have been processed.

In an alternative embodiment, all temporal transactions are submitted to the AVF 111 or AVF-D 112 by means of a proprietary Application Programming Interface (API). In this alternative embodiment, a temporal transaction will insert, update or delete data for only one object at a time.

A Temporal Insert Transaction.

All references, below, to "transactions", unless explicitly indicated otherwise, refer to temporal insert transactions until the section A Temporal Update Transaction is reached.

Step 701.

As submitted, a temporal insert transaction must specify (i) a target temporal table, (ii) a business key, (iii) any required TFKs, and optionally, (iv) an OID, (v) additional TFKs and (vi) any other business data that may be required. As shown in FIG. 10, the AVF begins processing temporal transactions by insuring that all required data is present and is syntactically correct. Temporal foreign key metadata 503 is associated with every table. If this metadata indicates that there are one or more TFKs on the table which are required (indicated by a value of "Yes" in the req-flg column of 503), then the AVF will reject the transaction unless it includes values for those required TFKs. Temporal foreign key metadata 505 may also associated with every table. It specifies the columns which make up the business key for the table. If an effective-time period is supplied on the transaction, the AVF checks that the end date on the time period is greater than the begin date.

Step 703.

As shown in FIG. 10, the AVF next supplies any default data required by the transaction. The AVF will supply a default assertion-time period for the transaction which is always [Now( )-9999]. A "basic temporal insert" does not specify any time periods. In that case, the AVF will supply a default effective-time period of [Now( )-9999].

(def) Now( ) this notation is used to indicate the current moment in time at which a transaction is being applied to the database.

An assertion-time period may never be specified on a temporal transaction submitted to the AVF and will always default to [Now( )-9999].

A temporal insert which is not a basic temporal insert may also be submitted to the AVF. On a non-basic temporal insert, all or part of an effective-time period is explicitly supplied with the transaction. If only an effective begin date is supplied, the AVF uses 9999 for the effective end date. If only an effective end date is supplied, the AVF uses the value of Now( ) for the effective begin date. This effective-time period may be any past, present or future time period. A present or future time period may be open, in which case it has a 9999 end date. A present or future time period may also be closed, in which case it has a non-9999 end date. Past time periods are always closed.

Step 705.

As shown in FIG. 10, the AVF defines a bi-temporal "target space" based on the effective-time period and assertion-time period of the transaction.

(def) target space: a range of assertion time together with a range of effective time, specified by a temporal transaction.

If each temporal dimension is represented as one axis on a Cartesian graph, then a transaction's target space may be represented as a rectangle on that graph, and the bi-temporal extent of any row in a temporal table may also be represented as a rectangle on that graph.

(def) target point: a target space is made up of target points. Because this is a two-dimensional space, each point is uniquely identified by a pair of coordinates. One coordinate is a clock tick in assertion time. The other coordinate is a clock tick in effective time.

Each row in a temporal table exists in a space defined by its pair of time periods. Each row "occupies" all of the points in that space.

(def) occupied space, occupied points: we will call the space associated with each row its "occupied space", and the points in its occupied space "occupied points".

Note that a point in either target space or occupied space corresponds to a pair of points in time, one of which is a point in assertion time and the other of which is a point in effective time.

Step 707.

As shown in FIG. 10, the AVF attempts to match the transaction to rows already in the target table. It searches for rows which match the business key specified on the transaction. If it finds such rows, the AVF checks among them to see if even one of them has even a single occupied point that matches a target point for the transaction.

If an OID is supplied on the transaction, the AVF will attempt to find a row already in the target table with the same OID and the same business key. If it does not find one, it rejects the transaction.

If the AVF finds such a row, it will reject the transaction. For example, if the transaction specifies a target space of effective time [January 12-9999] and assertion time [July1-9999], then a row for the same object, whose effective-time period is [March11-February12] and whose assertion-time period is [March11-9999], will cause the transaction to be rejected.

Step 709.

If the AVF does not find any such matching rows, it may still find a match to a row representing the same object, but a row whose occupied space is entirely outside the transaction's target space. If such a match is found, the AVF assigns the OID from the matching row in the target table to the transaction, and otherwise assigns a new OID.

At this point, the AVF has confirmed that applying the transaction to the database will not violate TEI, because no row already in the target table and representing the same object occupies any points within the transaction's target space.

Step 713.

Before a temporal table can be generated, metadata is created for it. If a temporal table contains a TFK, that fact is specified as metadata 503 in FIG. 5, along with a designation of the table referenced by the TFK, and also an indicator stating whether the TFK is optional or required. If no TFK is specified on the transaction, and there is no TFK defined as required for the target table, then the transaction is passed to the DBMS, which creates a new row in the temporal table for that transaction. Otherwise, the value provided for each TFK on the temporal insert transaction must pass the TRI check.

In one embodiment, the TRI check works as follows. Every TFK contains an OID value. For every TFK value supplied on the transaction, the AVF identifies a set of rows in the parent table which each have an OID which matches the OID value in the TFK, and which each have at least one occupied point which matches at least one point in the target space for the transaction.

parent occupied space, parent occupied points: we call the space occupied by the set of these parent table rows the "parent occupied space" corresponding to the transaction, and the points in that space "parent occupied points".

(def) points matching points: we say that a point in one space matches a point in another space if and only if the two points have the same temporal coordinates, i.e. occur at the same point in assertion time and the same point in effective time.

If for every point in the transaction's target space there is a matching point in the parent occupied space, then the transaction passes the TRI check, and otherwise does not. If the transaction passes all TRI checks, then the transaction is applied to the target table.

In another embodiment, the AVF matches rows in the parent table to transactions by assembling sets of effective-time periods from rows in the parent table that (i) entirely include the assertion-time period of the transaction, and (ii) that include at least one effective-time clock tick specified on the transaction. It then sequences the effective-time periods it has assembled, and looks for a contiguous set of time periods that have no gaps between them, and that together include the entire effective-time period specified on the transaction.

FIG. 11 shows a temporal table which contains two rows in a Policy table. As indicated by column 613, the business key for the Policy table, both rows represent insurance policy P861. The two rows describe that policy as it existed throughout 2008. From January to July of that year, as shown by the first row in FIG. 11, the policy was an HMO policy with a $10 copay. As shown by the second row in FIG. 11, the copay was increased to $15 in July, and thereafter the policy remained unchanged through the end of the year.

FIG. 12 shows the same temporal table after a temporal insert transaction was applied to it on March 2010. After a gap of fourteen months, policy P861 has been re-instated, as a PPO policy with a $15 copay. All three of the rows shown in FIG. 12 exist in the shared assertion time of [March10-9999]. All three have the same OID. But they do not exist in any shared effective time. If they did, that would be a TEI violation.

All three rows contain a TFK (615) of 8094. Because these three rows have passed TRI checks, the AVF knows that there is a set of rows in the Client table which have (i) an OID of 8094, (ii) an assertion-time period which began on or before January 2008 and which has an assertion end date of 9999, and (iii) an effective-time period which began on or before January 2008 and has an effective end date of 9999. Of course, since there is a fourteen-month gap during which policy P861 was not in effect, the set of rows in the Client table may also include that gap, or any smaller gap inside the same fourteen-month period of time.

The steps 701-715, shown in FIG. 10, do not necessarily represent the sequence of steps taken by the program code in this invention. They are intended to illustrate one way in which program code could be written to manage temporal insert transactions. Other embodiments of the transformations described by these steps are possible, and based on the description of these steps, one skilled in the art could design and build other such embodiments.

A Temporal Update Transaction.

All references, below, to "transactions", unless explicitly indicated otherwise, refer to temporal update transactions until the section A Temporal Delete Transaction is reached.

Steps 701, 703 and 705.

As submitted, a temporal update transaction must specify (i) a target temporal table, (ii) selection criteria, and whatever business data is to be updated. The selection criteria may include a business key, an OID, or both. If it does, only data representing the one object thus selected will be updated. Otherwise, the temporal update transaction may update data representing several objects.

Figure 13:
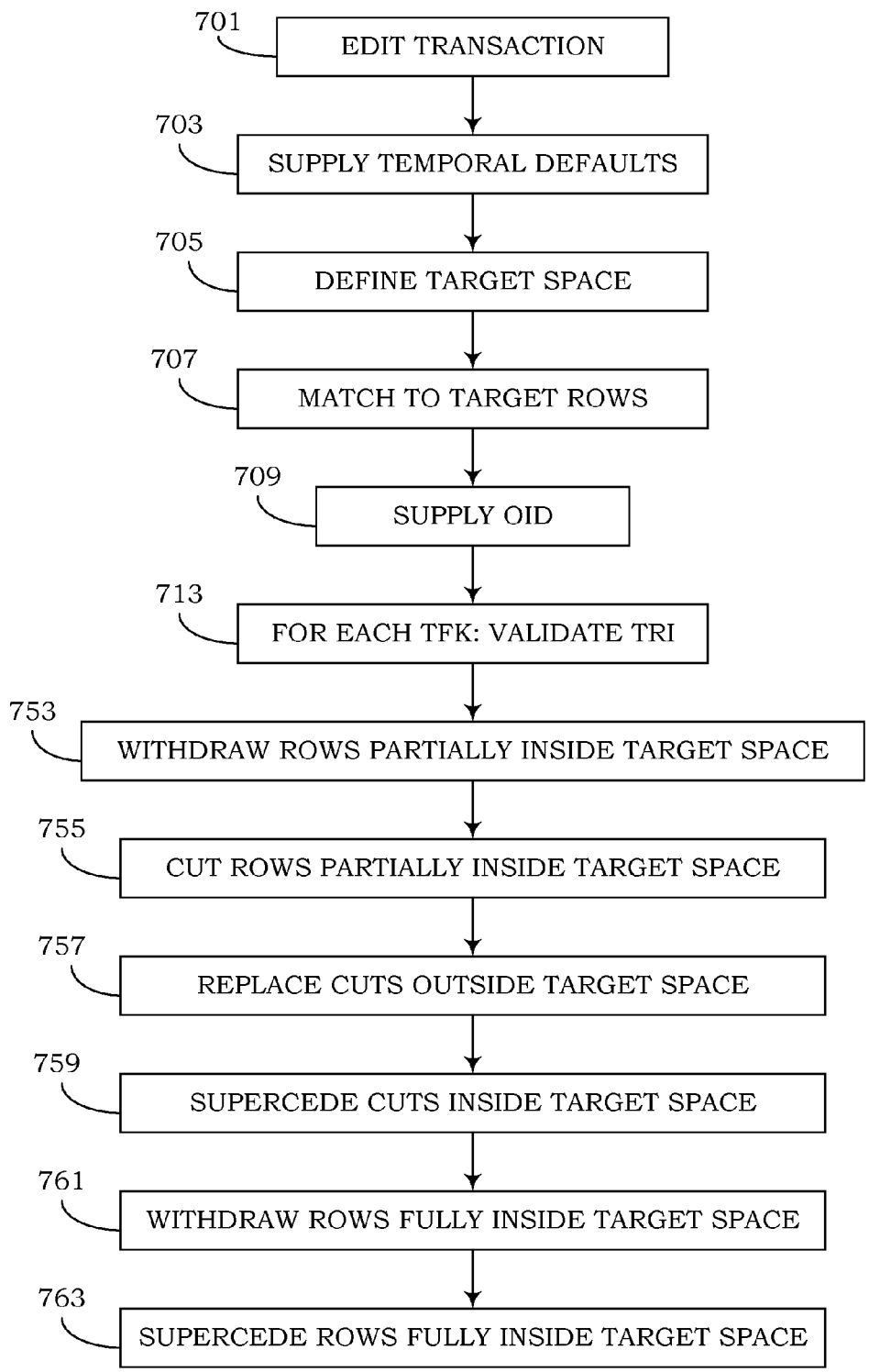
FIG. 13: the sequence of steps for processing a temporal update transaction.

As shown in steps 701, 703 and 705 in FIG. 13, the AVF edits the transaction, supplies temporal defaults, and defines the target space for the transaction just as it does for a temporal insert transaction.

A temporal update may or may not be a basic transaction. If it is, then no effective-time period is supplied with the transaction, and the AVF uses the default effective-time period [Now( )-9999].

Step 707.

Then, as shown in FIG. 13, in step 707 the AVF attempts to match the transaction to rows already in the target table which all represent one object and which have met the selection criteria from the transaction. As explained earlier, if rows representing multiple objects meet the selection criteria, then the processing done by the AVF is equivalent to looping through those objects and processing them one at a time.

If the AVF does not find such a row, it will reject the transaction. For example, if the transaction specifies a target space of effective time [January12-9999] and assertion time [July11-9999], then a row for the same object, whose effective-time period is [March11-February12] and whose assertion-time period is [March11-9999], will cause the transaction to be accepted. Also, to take another example, a row whose occupied space is wholly contained within the transaction's target space will cause the transaction to be accepted.

Step 709.

If a transaction was not supplied with an OID, then the AVF will assign the OID from a matching row in the target table to the transaction.

Step 713.

If one or more TFK values are supplied on the temporal update transaction, then the AVF carries out a TRI check on each of them.

If the temporal update transaction is not rejected, then the AVF continues to process it. All work done from this point forwards, until the transaction is complete, is done as an isolated and atomic unit of work.

Step 753.

As shown in FIG. 13, the AVF begins by withdrawing target rows which partially overlap the target space. These are rows (i) whose assertion-time periods end in "9999", and thus include the assertion-time period of the transaction, and whose effective-time periods (ii) share at least one clock tick with the effective-time period of the transaction, and also (iii) include at least one effective-time clock tick that is not included within the effective-time period of the transaction.

To withdraw a row is to change its assertion end date to the assertion begin date specified on the transaction. That point in time is always the point in time at which the transaction is being processed. Semantically, this means that from Now( ) on, the withdrawn row will no longer be asserted as making a true statement about the object it represents.

Step 755.

Next, the AVF "cuts" the row or rows withdrawn as part of the transaction.

(def) cut: to cut a withdrawn row is to create a set of rows which are identical to the withdrawn row except that (i) each row in the set is given the assertion-time period specified on the transaction, (ii) either one or two rows in the set has an effective-time period identical to the part of the withdrawn row's effective-time period that lies outside the transaction's target space, and (iii) one row in the set has an effective-time period identical to the part of the withdrawn row's effective-time period that lies inside the target space. In this invention, the assertion-time period specified on the transaction is always [Now( )-9999].

Step 757.

The AVF then physically inserts the one or two rows in the set of rows whose effective-time period lies outside the target space into the target table. These rows are said to "replace" the part or parts of the withdrawn row that were outside the target space of the transaction. These rows are given the assertion-time period specified on the transaction.

Step 759.

Next, the AVF applies the business data, and any temporal foreign keys, from the transaction to the remaining row in the set of rows. It then physically inserts this updated row into the target table, assigning it the assertion-time period from the transaction. This updated row is then said to "supercede" the part of the withdrawn row that was inside the target space of the transaction. For example, if the temporal transaction specified an insurance policy type of PPO, then the policy type in the superceding row is overwritten with that value.

Step 761.

Next, the AVF withdraws all rows which do not exist in past assertion time, but which have the same OID as the OID on the transaction, and whose effective-time periods are fully contained within the effective-time period of the transaction.

Step 763.

Next, the AVF makes a copy of those withdrawn rows, assigns them the assertion-time period specified on the transaction, and updates all data other than the two time periods on those rows with the corresponding data from the transaction. If any temporal foreign keys were specified on the transaction, the AVF also updates the temporal foreign keys on those rows with the values from the transaction. It then physically inserts those new rows, which are rows which supercede their corresponding withdrawn rows.

As already noted, all the physical updates and physical inserts required to complete a temporal update transaction are managed by the AVF as an atomic and isolated unit of work. If any of those physical transactions fails, the AVF will direct the DBMS to undo any earlier physical transactions that are part of that unit of work.

FIG. 14 shows the same temporal table as that shown in FIG. 12, but after a temporal update transaction has been applied to the table on September 2010. The first three rows in FIG. 14 are the same rows shown in FIG. 12. The temporal update transaction was processed on the clock tick of September 2010. The transaction either specified an effective-time period of [September10-9999] or, more likely, specified no effective-time period at all. In the latter case, the transaction was a "basic temporal update", and the AVF used the default value of [September10-9999] for the effective-time period. We may assume that by means of either an OID, a business key, or both, the AVF was able to match the transaction to the third row in the target table.

We may assume that the only business data supplied on the transaction was a new copay amount, because that is the only business data that the transaction changed. Therefore, there were no TRI checks to be performed by step 713 for this transaction.

Next, the AVF withdrew the one matching row it found, that being the third row in the target table shown in FIG. 14. It withdrew the row by physically overwriting its assertion end date of 9999 with the clock tick on which the transaction was being processed, that being September 2010. This was done in step 753.

Next, the AVF completed step 755. The result was to physically insert into the table the fourth and fifth rows shown in FIG. 14. In step 757, the AVF used the fourth row to replace the part of the withdrawn row that was outside the target space of the transaction. In step 759, the AVF updated the fifth row with the business data from the transaction, and thus superceded the part of the withdrawn row that was inside the target space of the transaction.

No other rows in the target table were wholly or partially within the target space of the transaction, and so the transaction was complete at that point in time. The atomic and isolated unit of work was complete, and all locks used in the process were released.

The steps 701-763, shown in FIG. 13, do not represent the sequence of steps taken by the program code in this invention. They are intended to illustrate one way in which program code could be written to manage temporal update transactions. Other embodiments of the transformations described by these steps are possible, and based on the description of these steps, one skilled in the art could design and build other such embodiments.

A Temporal Delete Transaction.

All references, below, to "transactions", unless explicitly indicated otherwise, refer to temporal update transactions until the section Support for Uni-Temporal and Non-Temporal Data as Abstractions is reached.

As submitted, a temporal delete transaction must specify (i) a target temporal table, and (ii) selection criteria. The selection criteria may include a business key, an OID, or both. If it does, only data representing the one object thus selected will be deleted. Otherwise, the temporal delete transaction may delete data representing several objects.

As shown in steps 701, 703 and 705 in FIG. 13, the AVF edits the transaction, supplies temporal defaults, and defines the target space for the transaction just as it does for a temporal insert transaction.

A temporal delete specifies that, for the object it represents, no rows may remain asserted in the target table anywhere within the assertion-time period and the effective-time period specified on the transaction. A basic temporal delete has no effective-time period supplied with the transaction, and so the AVF associates the default effective-time period [Now( )-9999] with the transaction. The result will be to withdraw any rows in current assertion time which have even a single effective-time clock tick within that period of time. A non-basic temporal delete will have an effective-time period supplied with the transaction, or else it will supply a begin date only or an end date only. In the former case, the AVF uses 9999 for the end date; in the latter case, it uses the value of Now( ) for the begin date. For example, a non-basic temporal delete might specify an effective-time period of [April09-December15]. The result of that delete will be that no currently asserted rows will remain in the target table that represent the indicated object, and whose effective-time periods fall anywhere within that range of time.

A temporal delete requires that, for any row whose occupied space lies partially within the transaction's target space and partially outside that target space, the AVF withdraw that row and replace the part of the row which lies outside that target space. We note that if the row's effective-time period begins before the effective-time period on the transaction, and also ends after the effective-time period on the transaction ends, that the AVF will insert two replacement rows for the withdrawn row, one on either side of the transaction's specified effective-time period.

The AVF then withdraws all rows which, within in the assertion time specified on the transaction, have effective-time periods which lie completely within the effective-time period specified on the transaction. The result is that, from the assertion begin date specified on the transaction on into the future, until and unless later temporal insert transactions re-populate all or part of those withdrawn representations of the object, the target table will not assert any representation of the object within that period of effective time.

If a conventional transaction deletes a row in a table which is the parent table in a referential integrity relationship, the DBMS must insure that the result of the transaction does not leave any "dangling references" to that row from the child table. In other words, it must not leave any rows in the child table which have foreign keys pointing to the row in the parent table that were deleted.

As is well-known to those skilled in the art, a relational DBMS has three ways to prevent dangling references being created by a delete transaction. One way is to restrict the delete transaction as long as there are any child rows that would be left with dangling references. A second is to remove the dangling references in the child rows by setting the foreign keys in those rows to null. The third is to cascade the delete of the parent row or rows, deleting all the child rows that point to it.

The third option, of course, is recursive, because if a child row is deleted, and it is also a parent row to some other row, then deleting it would leave a dangling reference to it. Once again, the DBMS has three options to avoid the dangling references.

To illustrate the multi-table effect of a temporal delete transaction, we consider an example in which two tables are involved. The parent table is a Client table, as shown in FIG. 16a. We will assume that a temporal delete transaction is being processed on December 2010, and that it specifies that client C457 was in fact not a client of our company during the months of July through October of 2010. This is obviously a retroactive transaction, correcting a mistake in the database.

FIG. 16b shows the same temporal table as that shown in FIG. 16a, but after a temporal delete transaction has been applied to the table on December 2010. This temporal delete specified that client C457 should be removed from the four months of July through October of 2010. Therefore, from this point in assertion time, which is December 2010, the table must not contain an assertion that client C457 was in effect during any of those four months.

Steps 701, 703, 705, 707, 709.

Figure 15:
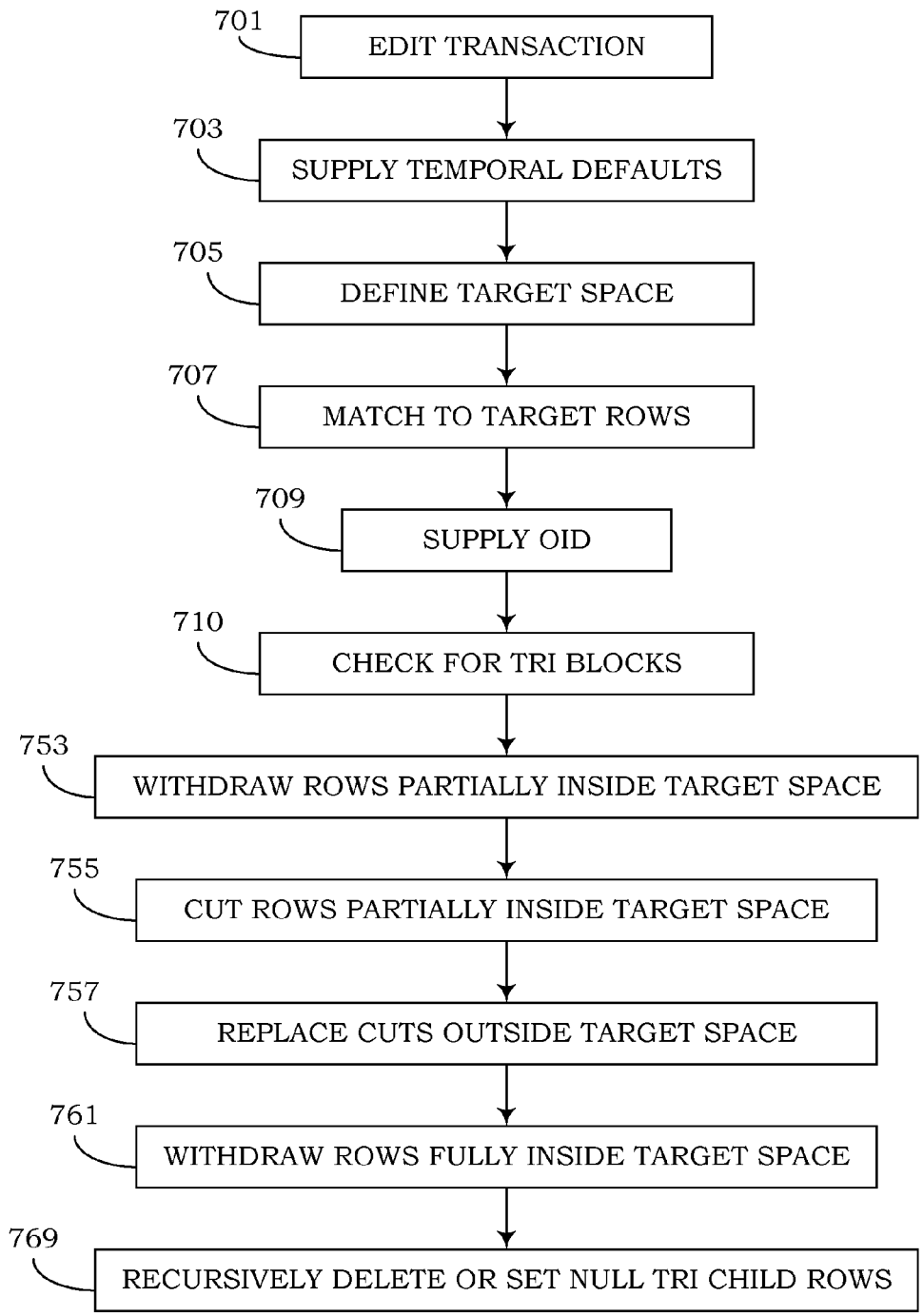
FIG. 15: the sequence of steps for processing a temporal delete transaction.

As shown in FIG. 15, in steps 701, 703, 705, 707, and 709, the AVF edits the delete transaction (701), supplies temporal defaults (703) and defines the target space (705). It then matches rows in the target table to the target space (707). As with a temporal update transaction, the AVF requires that there is at least one row representing an object selected by the transaction, and that occupies at least one point that matches a point in the transaction's target space.

If there is no such row, the AVF rejects the transaction. However, the one row for client C457, as shown in FIG. 16a, meets this criterion, and so the AVF accepts the transaction. If no OID was supplied on the temporal delete transaction, then in step 709, the AVF attaches the OID from the matching row to the transaction.

Step 710, Client Table.

Next, the AVF checks to see if any child rows to client C457 also exist within the transaction's target space. It looks at the temporal foreign key metadata 503, shown in FIG. 5. The metadata indicates that the Client table is a parent table in a TRI relationship, and that a temporal delete against that table should be cascaded to the Policy table. Since the metadata does not specify that the temporal delete should be restricted, and since there are no other tables for which the Client table is a parent table in a TRI relationship, the AVF continues to process the transaction.

In our preferred embodiment this metadata is used to create static scripts that perform these operations, but in another embodiment this metadata could be evaluated dynamically at run time.

Step 753, Client Table.

The temporal delete transaction specified an effective-time period of [July10-November10]. In this invention, the transaction defaulted to an assertion-time period of [Now( )-9999], with Now( ) being the clock tick of December 2010. There is only one row for client C457, and some of its occupied points match points in the target space of the transaction, while others do not. Therefore, the AVF begins by withdrawing that one client row. As shown in FIG. 16b, it does this by overwriting the 9999 assertion end date on the row, changing the rows assertion-time period to [January08-December10]. In other words, as soon as this transaction is complete, that row will no longer be asserted to make a true statement.

Step 755, Client Table.

In this example, the target space is wholly contained within the occupied space of the one row for client C457. Therefore, the cut operation, step 755, results in three rows. Two are outside the target space, and one is inside the target space.

Step 757, Client Table.

Next, the AVF inserts into the target table the two rows resulting from the cut operation which are outside the target space of the transaction. The middle row is discarded, and is not added to the target table, because it represents the effective-time period specified on the delete transaction. The two rows added in this step are shown as the second two rows in FIG. 16b.

Step 761, Client Table.

There are no other rows for client C457 within the target space of the transaction, so there is no work for this step to do.

The AVF has already determined that this temporal delete transaction should cascade to any dependent tables, and that there is one such table, that being the Policy table. Since steps 701-709 have already been applied to the temporal delete transaction, they do not need to be invoked a second time, and so the temporal delete transaction, as applied to the Policy table, begins with step 710.

Step 710, Policy Table.

By referencing the temporal foreign key metadata 503, the AVF determines that the Policy table is not a parent table in any TRI relationship. If it were a parent table in a TRI relationship, and if the metadata said that a temporal delete to that table should be restricted as long as there were any TRI dependents on the data about to be deleted, then the AVF would have to direct the DBMS 115 to undo the physical updates that had already been made as part of carrying out this temporal delete transaction.

Step 753, Policy Table.

The temporal delete transaction specified an effective-time period of [July10-November10], and defaulted to an assertion-time period of [Now( )-9999], with Now( ) being the clock tick of December 2010. There are two rows in the Policy table whose TFKs reference client C457 (by containing the OID value of 8094), and which each have some occupied points which match points in the target space of the transaction, and some occupied points which do not. These are the fourth and fifth rows shown in FIG. 14 and also FIG. 16c. FIG. 14 shows these rows before the temporal delete transaction is applied to them. FIG. 16c shows these rows after the transaction is applied. These two rows are withdrawn by overwriting their assertion end dates with the current clock tick. As shown in FIG. 16c, the result is to change the assertion-time period on these rows to [September10-December10]. In other words, as soon as this transaction is complete, those two rows will no longer be asserted to make true statements.

Step 755, Policy Table.

In this example, the cut operation cuts the first withdrawn row into two rows, and also cuts the second withdrawn row into two rows. The two rows resulting from the cut of the first withdrawn row have effective-time periods of [March10-July10] and [July10-September10]. The two rows resulting from the cut of the second withdrawn row have effective-time periods of [September10-November10] and [November10-9999].

Step 757, Policy Table.

Next, the AVF inserts into the target table the two rows resulting from the cut operation which are outside the target space of the transaction. They are (i) the first row in the first pair of rows, and (ii) the second row in the second pair of rows. These rows are given the assertion-time period specified on the transaction, which is [Now( )-9999], and appear in FIG. 16c as the last two rows in the table.

Step 761, Policy Table.

The other two rows produced by step 755 are discarded, because they fall entirely within the target space of the transaction.

The transaction is now complete. Prior to December 2010, currently asserted rows in the database stated that there was a client C457 in effect during the months of July, August, September and October of 2010, and also that this client owned a policy P861 which was in effect during that time, and which in July and August had a copay of $15, and in September and October had a copay of $20. Starting on the clock tick of December 2010, there are no currently asserted rows making any of these statements. By a natural extension of the Closed World Assumption to this database, we can say that, starting in December 2010, the database states that there was no such client and no such policy in effect during those four months of 2010.

Support for Uni-Temporal and Non-Temporal Data as Abstractions.

Improvements are to add to the functionality of some embodiments the ability to support queries for either kind of uni-temporal data, and queries for non-temporal data, without exposing to the authors of those queries the complexities of the canonical schema 600, or the complexities of a table which may contain rows which exist in any of the temporal categories past/past 121, past/present 123, past/future 125, present/past 127, present/present 129 or present/future 131, as shown in FIG. 1.

Some embodiments already makes it possible for the authors of maintenance transactions to write insert, update and delete transactions against the canonical schema 600 without being exposed to the complexities of the canonical schema 600 or the complexities of the contents of those tables. When no temporal parameters are expressed on temporal transactions, it appears to the authors of those transactions that they are writing transactions against the otherwise identical non-temporal table. When effective time is expressed on temporal transactions, it appears to the authors of those transactions that they are maintaining simple uni-temporal version tables. Yet in both cases, the AVF is supporting changes in assertion time as well, and by that means is able to present, as queryable objects, either otherwise identical non-temporal data as it physically existed at any point in time, or uni-temporal version data as that data existed at any point in time.

So together with these encapsulation capabilities for maintenance transactions, the encapsulation capabilities of additional embodiments mean that by means of the AVF and its universal canonical schema, the complexities of managing and querying bi-temporal data as though it were non-temporal data are eliminated, and the complexities of managing and querying bi-temporal data as though it were uni-temporal versioned data are also eliminated.

Nowhere in the prior art is it proposed that valid time data, transaction time data and non-temporal data can be managed and queried as abstractions on temporal data which is physically implemented only in bi-temporal tables. But this is one of the features of our invention. We continue our discussion of this implementation using our terminology of "effective time" and "assertion time". As explained earlier, effective time is equivalent to valid time, and until we begin to discuss deferred assertions, assertion time functions exactly as transaction time does.

The Management of Uni-Temporal and Non-Temporal Data as Abstractions.

The invention manages effective-time data, assertion-time data and non-temporal data as abstractions on the bi-temporal data stored in the tables which conform to its canonical schema.

The AVF does this by means of the temporal transactions it supports, and the bi-temporal data into which it maps the results of carrying out those transactions. Assertion-time periods cannot be specified on the temporal transactions, and so the role of assertion-time periods in tracking changes to data which do not correspond to changes in the objects represented by that data is transparent to the user of the invention. But every time a temporal transaction changes the data which describes the state of an object during a period of effective time, the AVF preserves the before-image of that data as a withdrawn assertion. And so when users of the database write temporal transactions, even though they do not specify assertion time on those transactions, the AVF does manage those transactions so as to keep a complete record of all uni-temporal assertion-time data in its canonical tables.

Valid-time periods can be specified on the temporal transactions. When they are, the data on the transaction is interpreted as describing the state of the object designated by the transaction only during that valid-time period. In this way, data describing past, present and future states of objects can be entered into the database at any time, and the database always contains the most current description of the state of an object at any point in valid time. When two or more rows of data in a canonical table both contain a description of the state of an object at a given point in valid time, the most current description of that state of the object is the one provided by the row which is most recent in transaction time. And so when users of the database write temporal transactions, the AVF does manage those transactions so as to keep a complete record of uni-temporal valid-time data in its canonical tables. And to those users, it will seem as though they are maintaining uni-temporal valid-time tables.

It is not necessary to specify valid-time periods on the temporal transactions. If a valid-time period is not specified on a temporal transaction, we refer to it as a "basic" temporal transaction. Basic temporal transactions make it appear that it is a conventional, non-temporal table that is being maintained, because of the implicitly understood semantics of conventional tables. Those semantics are that every row in a conventional table, at each point in time, represents (i) the assertion that, at that point in time, that row makes a true statement, and (ii) the assumption that, at that point in time, that row describes the then-current state of the object it represents. The only way to remove that assertion of that description from a conventional table is to delete the row in question.

Every basic temporal insert or update results in a row with these same semantics. Every basic temporal delete results in the same semantics by withdrawing one or more currently asserted rows into past assertion time. Inserts, updates and deletes of data describing a specific object, as basic temporal transactions, will seem to be inserting, updating and deleting the one row of data in a conventional table that represents that object. However, what in fact is happening is that the AVF is keeping track of the bi-temporal history of that object and of the data that describes it.

The Querying of Uni-Temporal and Non-Temporal Data as Abstractions.

Some embodiments complement the management of temporal transactions just described by providing views corresponding to each of the two kinds of uni-temporal table, and also by providing a view over each canonical table which corresponds, in both schema and content, to an otherwise identical non-temporal table.

Figure 22:
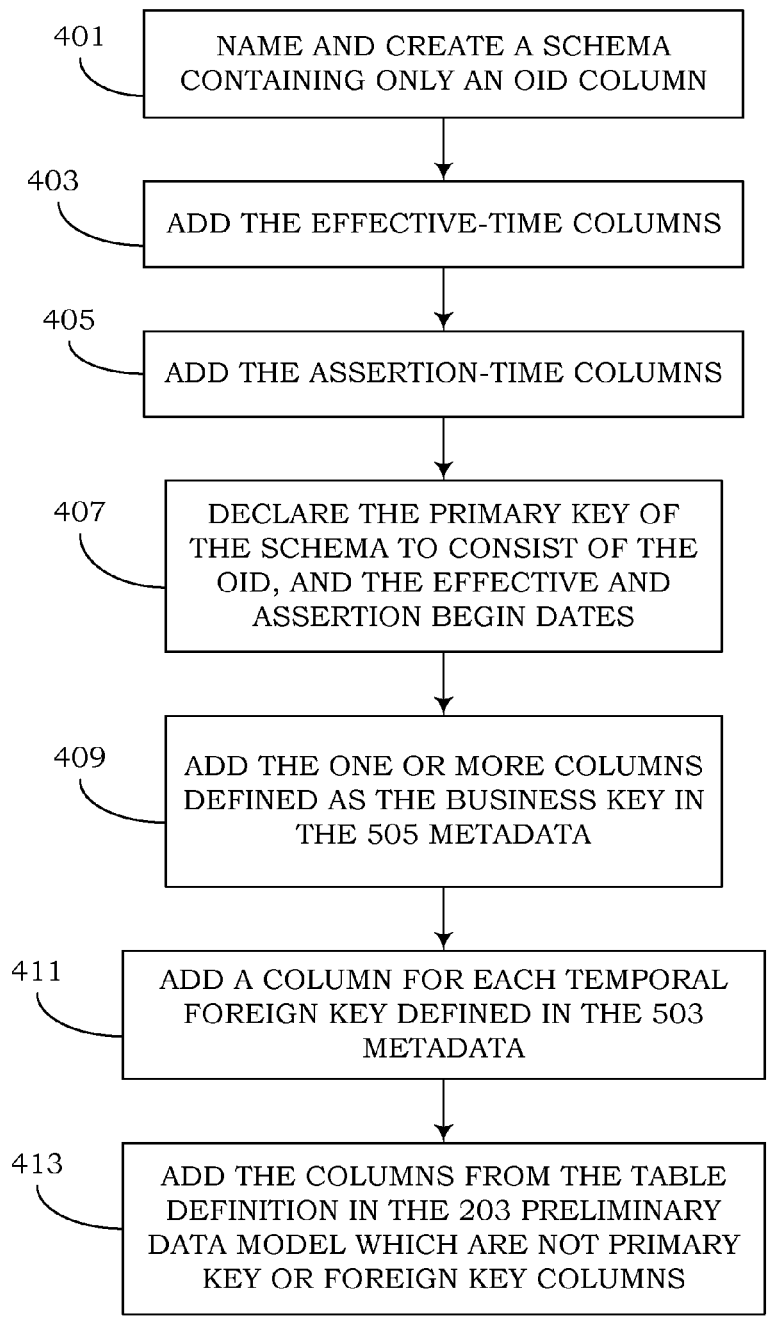
FIG. 22: the sequence of steps for generating temporal tables from a preliminary data model together with metadata expressing the temporal features of those tables.

FIGS. 20, 21 and 22 show different views of the Policy table shown in FIG. 16c and in other figures. As already explained, the notation "Now( )" is our DBMS-agnostic way of designating the current moment in time, and the notation "9999" is our DBMS-agnostic way of designating the highest temporal value a specific DBMS can recognize. Note that in FIGS. 20, 21, 22, 23, the physical names of the two temporal tables are Client_AV and Policy_AV.

FIG. 18 shows one particular transaction-time view. It is a dynamic view, one that is always current because "Now( )" is a variable. As will be apparent to one skilled in the art, this view will always present all and only those rows from the Policy_AV table whose effective-time period is current. Some of these rows may be past assertions about those objects in their current effective-time periods. Other rows may be current assertions about those objects in their current effective-time periods. This view thus constitutes a "semantic log-file" of any changes to data that describes the current state of objects represented in the table.

FIG. 19 shows one particular valid-time view. It is also a dynamic view. As will be apparent to one skilled in the art, this view will always present all and only those rows from the Policy_AV table which are currently asserted to make true statements. It thus constitutes a record of all statements which we currently claim are true about what the objects represented in the table used to be like, are currently like, and will in the future be like (to the best of our knowledge).

FIG. 20 shows one particular valid-time view. It is also a dynamic view. As will be apparent to one skilled in the art, this view will always present all and only those rows from the Policy_AV table which are currently asserted to make true statements, and which are statements describing the current state of the objects they represent. The contents of this view thus correspond, row for row, at each moment in time, with the contents of an otherwise identical non-temporal table.

FIG. 21 shows the view by means of which this invention supports the temporal upward compatibility of queries originally written against non-temporal tables. It will be clear to one skilled in the art that such a view must have (i) the same name as the original non-temporal table, (ii) exactly the same set of columns as the columns in the original non-temporal table, (iii) the same name for each column as the corresponding column in the original non-temporal table, and (iv) the same set of rows, at each moment in time, that would have been contained in the temporal table if it had remained a non-temporal table.

The section entitled Foundational Concepts: an Otherwise Identical Non-Temporal Table, describes an algorithmic process by which a temporal upward compatibility view could be automatically generated for each temporal table using the canonical schema and the metadata of this invention.

In FIG. 21, we show such a view for the Policy table. We assume, in this view, that "Policy" is the name of the original non-temporal table of policies, and that "Client_AV" is the name of the temporal table of clients shown in FIG. 16a and elsewhere. In FIG. 17b, reference character 303 designates the schema of the original non-temporal Policy table. It should be apparent to one skilled in the art that the view statement shown in FIG. 21 defines the same identical schema.

The view V_Policy_Non_Temp_Curr, which is shown in FIG. 20, restricts the rows from the Policy_AV table which will appear in the view to those rows which are current in both valid time and transaction time. Since the Policy view, shown in FIG. 21, selects its rows from this view shown in FIG. 20, and since the Policy view does not filter out any rows, it should be apparent to one skilled in the art that the view statement shown in FIG. 21 will result in a view which, at each moment in time, contains all and only those rows from the temporal table that are current in both valid time and transaction time.

Support for the Generation of Temporal Tables From Precursor Tables Plus Metadata.

This is for an improvement on previously-described implementations.

We begin by defining some necessary terminology.

(def) physical data model: we use this term as it is understood by data modelers throughout the Information Technology profession. Paradigm examples are the physical data models produced by the ERwin data modeling tool.

(def) non-temporal physical data model: a physical data model none of whose tables include valid time or transaction time, and none of whose tables include effective time or assertion time.

(def) preliminary data model: a non-temporal physical data model from which, together with temporal metadata, this invention will generate a temporal database.

(def) precursor table: a table in preliminary data model from which, together with temporal metadata, this invention will generate a temporal table.

(def) temporal table generated by this invention: a temporal table generated from a precursor table, together with temporal metadata, by this invention.

(def) Asserted Versioning Framework Script/Code: program procedure or program code logic that is generated and executed statically, or executed dynamically, using temporal metadata that enforces temporal constraints and manages the temporal data defined in this invention as temporal transactions are applied to them.

For each precursor table in a preliminary data model, this invention generates a temporal table by carrying out the following steps, as shown in FIG. 22. We will describe the generation of the Policy canonical schema temporal table 119, shown in FIG. 8 from the Policy precursor table 202 shown in FIG. 3.

Step 401.

The invention names and creates a schema which conceptually, at this point, contains only an OID column. As determined by the metadata 501, the name of that schema is Policy_AV. The OID is the column policy-old.

We note that here, and elsewhere in this patent application, including in some of the Figures, column names contain hyphens, but in others of the Figures, the same column names contain underscores in place of hyphens. As physically implemented, of course, column names must not contain hyphens.

Step 403.

The two columns of the Policy canonical schema temporal table 119 eff-beg-dt and eff-end-dt are next added to the schema. In another embodiment, a single column using a PERIOD datatype could be used.

Step 405.

The two columns of the Policy canonical schema temporal table 119 asr-beg-dt and asr-end-dt are next added to the schema. In another embodiment, a single-column using a PERIOD datatype could be used.

Step 407.

In this embodiment, the effective-time period is represented in the primary key of every temporal table by means of the eff-beg-dt only, and the assertion-time period is represented in the primary key of every temporal table by means of the asr-beg-dt only. In other embodiments, the end dates could be used instead, or both the begin and end dates. In another embodiment in which each time period is represented by a single-column using a PERIOD datatype, those two columns would be part of the primary key.

Step 409.

As directed by the metadata 505 shown in FIG. 6, the AVF next adds the column policy-nbr to the schema.

Step 411.

Figures 3, 4, 5:
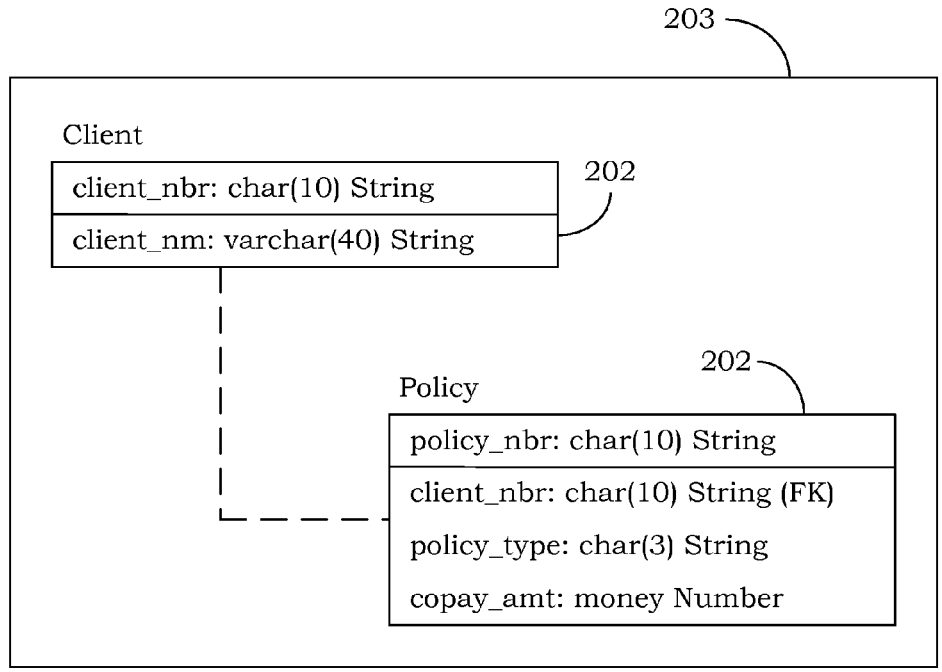
FIG. 3: a preliminary data model 203. This figure shows the precursor tables 202 from which, together with metadata, the invention will generate temporal tables.
FIG. 4: precursor table metadata 501, with one entry for every table in the preliminary data model from which the invention will generate a temporal table.
FIG. 5: temporal foreign key metadata 503, with one entry for every temporal foreign key. Each entry identifies the table in which the temporal foreign key occurs, the name of the temporal foreign key column, and the table to which the temporal foreign key refers. It also indicates whether the temporal foreign key is optional or required, and whether the presence of affected dependent rows should restrict the delete, cause the delete to set referring temporal foreign keys to null, or cascade the delete.

As directed by the metadata 503 shown in FIG. 5, the AVF next adds the column client-oid to the schema.

Step 413.

The AVF now reviews the schema of the precursor table 202 in the preliminary data model 203, as shown in FIG. 3. The primary key column has already been represented in the temporal schema by the business key column. The foreign key column has already been replaced by a temporal foreign key column. The remaining columns are policy-type and copay-amt, and the AVF now adds them to the schema for the temporal table.

An Additional Role for Temporal Metadata.

A temporal table has now been generated from the combination of a precursor table in a preliminary data model, and temporal metadata. When this has been done for every precursor table listed in the metadata 501, the generation of all temporal tables in the temporal database is complete.

However, we note that the temporal metadata is not only used by the AVF to generate temporal tables from precursor tables. It is also used in the management of those temporal tables, as temporal transactions are applied to them.

The metadata 501 allows the AVF to translate temporal transactions which name otherwise identical non-temporal tables into physical transactions which name the temporal tables which physically exist in the database.

The metadata 503 is a declarative specification of all temporal foreign keys in the database, naming the temporal foreign key column, indicating whether each one is optional or required, and indicating how each one is to be treated when involved in a temporal delete transaction.

The business key metadata 505 identifies the column or columns in each temporal table which correspond to the primary key column or columns in the corresponding otherwise identical non-temporal table. This is important for creating the view which supports temporal upward compatibility for queries against an earlier non-temporal form of the table. One reason this metadata is important is that these columns will appear in the view in place of the primary key columns of the temporal table. A second reason this metadata is important is that the values for these columns are in fact the values which will populate the foreign key columns in the view which supports temporal upward compatibility for the temporal tables which reference the temporal tables in which these columns are the business key columns.

The metadata 507 which maps foreign keys to temporal foreign keys is also important for creating the view which supports temporal upward compatibility for queries against an earlier non-temporal form of the table, because these foreign key columns will appear in the view in place of the temporal foreign key columns of the temporal table. These foreign key columns are the columns that will be populated by the values from the business key columns of the temporal table to which the temporal foreign keys replaced by these foreign keys refer.

Benefits of Generating Temporal Tables From Precursor Tables and Temporal Metadata.

This aspect adds to various implementations the ability to express requirements for temporal data as metadata, and thus to avoid the need to design specifically temporal tables, columns, keys, etc. in any kind of data model including a relational logical data model, an entity-relationship data model or a physical data model. It also adds to the various implementations the ability to automatically generate temporal tables from precursor tables and the temporal metadata associated with them.

This invention has several important benefits. First, it eliminates the work involved in expressing temporal requirements in data models. The amount of work can be substantial, as is shown in Chapter 11 in the book by Dr. Richard Snodgrass (Snodgrass, 2000). This chapter takes fifty-five pages to explain how to express temporal data requirements in data models.

Second, this invention means that existing data models which do not express temporal requirements do not have to be modified whenever one or more non-temporal tables in a database are converted to temporal tables. This preserves the business value of existing data models, which can remain unchanged as the databases they describe evolve over time to contain an increasing number of temporal tables and a smaller number of non-temporal tables.

Third, this invention means that there are no differences in how the same temporal requirements are implemented by different project teams designing solutions for different subsets of the tables in one or more databases. The process of generating one or more temporal tables of a database from a preliminary data model together with metadata means that this invention guarantees that all temporal tables will have the same canonical schema, and therefore can be maintained with the same codebase and with the set of transactions without regard to ad hoc differences reflecting different approaches by different design teams to solving the same set of requirements, and can also be referenced in queries without needing to elaborate those queries to overcome such ad hoc differences.

Fourth, this invention eliminates the complex, custom code that application programs would otherwise require to properly maintain temporal data. All the complexities of maintaining temporal data are isolated in the AVF. The work of application programs is simply to accept temporal transactions as input, and pass them on to the AVF.

Support for Episodes.

This aspect is for an improvement on the previously-described embodiments.

This aspect differs from the previously-described embodiments by the addition of a user-defined managed object which we call an episode, and by extending the AVF to use episodes to manage temporal tables.

(def) A managed object is the representation, in data, of a specific object or of a specific type or concept.

A table is a managed object representing a type such as customers or products. A row in a conventional table is a managed object representing an instance of a type such as a specific object or a specific product.

(def) AVF-E: (def) the extension of the AVF to use episodes to manage temporal tables.

The series of steps by which the AVF-E manages temporal transactions, and the data in extended canonical schema tables which result from those transactions, is the same series of steps by which the AVF manages temporal transactions, and the data in canonical schema tables which result from those transactions, except that the AVF-E manages episode begin dates and uses them in carrying out temporal referential integrity checks. The management and use of episode begin dates replaces the processes that the AVF uses to dynamically create and utilize occupied spaces and points, and parent occupied spaces and points.

The managed object we call an episode is a set of rows. It is managed by means of one column added to our canonical schema. That is the column designated by reference character 618 in FIG. 23. With the addition of this column, our canonical schema 600 becomes our extended canonical schema 623.

(def) An episode is a set of rows in a temporal table which have (i) the same OID, (ii) a shared period of assertion-time, (iii) effective-time periods which do not overlap and which, in effective-time chronological sequence, do not contain any gaps between any adjacent pairs of those rows, and (iv) for which there is no other row which has (iv-a) the same OID, (iv-b) an assertion-time period which is identical to or which overlaps the shared assertion-time period of the rows in the set, and (iv-c) an effective-time period which is effective-time contiguous with the effective-time period of either the effective-time earliest or latest row in the set.

Within any period of assertion time, every episode is uniquely identified by an OID and a point in effective time. That point is the earliest point in effective time of all the rows in the set. It is represented by the episode begin date 618, and in our preferred embodiment, the value in that column will be identical to the value in the effective begin date 603 of that earliest row in that set. All the rows which belong to the same episode have the same episode begin date.

We will first describe episodes in terms of how they are managed, and then in terms of how they are used.

The Management of Episodes.

The shared assertion time of a set of rows is the largest assertion-time period included in the assertion-time periods of all the rows in the set. In the two rows shown in FIG. 24, that shared assertion time is the assertion-time period of [July08-9999].

Both the AVF and the AVF-E, which is the extended version of the AVF 111 shown in FIG. 1, will guarantee that, within shared assertion time, no two rows in any set of rows with the same OID will have identical or overlapping effective-time periods. This guarantee is provided by enforcing the constraint of temporal entity integrity. It follows that none of the rows in an episode will have identical or overlapping effective-time periods.

However, within shared assertion time, and among rows with the same OID, there may be temporal gaps between any two effective-time adjacent pairs of those rows. Each such gap defines the end of one episode of the object represented by that OID, and also defines the beginning of another episode of the object represented by that OID. This follows from component (iv) of the definition of an episode, provided above.

An episode can be added to a temporal table by a temporal insert transaction. It can also be created by a temporal delete transaction which removes a period of effective time from within the effective time of an existing episode. By doing so, the temporal delete transaction creates a gap in effective time, and as the previous paragraph explains, such a gap defines the boundary between two adjacent episodes. There is no other way to add an episode to a temporal table.

An episode can be removed from a temporal table by a temporal delete transaction, or by a temporal insert transaction which merges two episodes into one episode. There is no other way to remove an episode from a temporal table.

(def) "next to": two points in time, in the same temporal dimension, are "next to" one another if and only one follows the other without any gap in time between them. It is important to emphasize, however, that because of the closed-open convention used to represent time periods in this embodiment, if two time periods are next to one another, then the end date of the earlier one will have the same value as the begin date of the later one.

A temporal insert transaction results in a new episode if and only if there is no row for the same object already in the target table whose effective end date in time is next to the new row's effective begin date, and also no row for the same object already in the target table whose effective begin date is next to the new row's effective end date. In this case, the new row's episode begin date is given the same value as its effective begin date. Here and elsewhere, we sometimes leave out the phrase "within shared assertion time", but that phrase should always be understood to apply. In any comparison of points or periods in effective time, the comparison always takes place within shared assertion time. Rows which do not share any assertion time cannot be compared; they are incommensurable.

Effective begin dates, effective end dates, assertion begin dates and assertion end dates are the means by which, in this embodiment, individual effective-time periods and individual assertion-time periods are defined. In another embodiment, these time periods might be defined by single columns with a PERIOD datatype.

Regardless of the embodiment, time periods always have a known begin point in time, and always last for at least one clock tick. Closed time periods also have a known end point in time. Open time periods are assigned, as an end point in time, the latest point in time which the DBMS can represent. In another embodiment, open time periods might be designated by using NULL, or by using any other special value which will be managed and interpreted as representing the latest possible point in time.

If the effective begin date of a new row created by a temporal insert transaction is next to the effective end date of another row with the same OID, then the new row extends the episode that the other row belongs to forwards in effective time. In that case, the new row is given the episode begin date of that other row, indicating that it has become part of that episode.

If the effective end date of a new row created by a temporal transaction is next to the begin date of another row with the same OID, then the new row extends the episode that the other row belongs to backwards in effective time. In that case, the new row is given its own effective begin date as its episode begin date. In addition, the row it is next to, and all other rows in that other row's episode, are withdrawn and are replaced with rows whose episode begin date matches the effective begin date of the new row just inserted, whose assertion-time periods are the same as the assertion-time period of the new row, and whose effective-time periods, business keys and other business data are otherwise unchanged. The new row, and all these replacement rows, then belong to the same episode.

If the new row created by the temporal insert transaction is next to both an earlier row for the same object and a later row for the same object, then both of the "next to" conditions are satisfied, and the result is that the new row merges two previously distinct episodes into a single episode. In that case, the new row is given the episode begin date of the earlier row it is next to. Next, the later row the new row is next to, and all the other rows in that later row's episode are withdrawn and replaced, as described in the previous paragraph. All the rows in the two episodes, and the new row which has merged them, are now part of the earlier of the two episodes that have been merged by this transaction.

A temporal delete transaction always specifies an object, and has an effective-time period. If no time period is supplied with the transaction, the default time period of [Now( )-9999] is added to the transaction. Otherwise, a past, present or future effective-time period may be supplied with the transaction.

A temporal delete transaction withdraws rows from a designated period of effective time by ending the assertion-time periods of those rows within that period of effective time. It does this by changing the assertion end dates of those rows to the value of Now( ) at the time the transaction takes place. If necessary, a temporal delete transaction will withdraw a row which is partially within the designated effective-time period of the transaction, and replace the part of the row that was outside that effective-time period. This is similar to a "cut" done as part of a temporal update transaction, but whereas the cut creates two rows which together correspond to the withdrawn row, this process only creates the one row which corresponds to the part of the withdrawn row that is outside the target space of the transaction.

Rows whose effective-time periods are entirely outside the effective-time range of a delete transaction's target space are unaffected by the delete transaction. It follows that episodes, all of whose rows are entirely outside the effective-time range of a delete transaction's target space, are unaffected by the delete transaction.

Conversely, episodes, all of whose rows are entirely within the effective-time range of a delete transaction's target space, are temporally deleted. They are withdrawn by having their assertion end dates set to the value of Now( ) when the transaction is carried out.

If a row in the target table with the same OID has an effective-time period which falls partially inside the effective-time period of the temporal delete transaction and partially outside that effective-time period, then the row is withdrawn, and a replacement row is created, in current assertion time, for the part of the withdrawn row that was outside the transaction's effective-time period.

If the replacement row is for the effective-time later part of the withdrawn row, then it is the first row in a new episode, and its episode begin date is set to its own effective begin date. In addition, every effective-time later row that was part of the original episode with that withdrawn row is also withdrawn, assigned an assertion-time period of [Now( )-9999], and given the episode begin date of that first replacement row.

If the replacement row is for the effective-time earlier part of the withdrawn row, then it is the last row in the episode it still belongs to, and its episode begin date remains the same as it was before the transaction.

If the effective-time period on a temporal delete transaction begins after the effective-time period of the first row in an episode, and ends before the effective-time period of the last row in an episode, then the temporal delete transaction splits the episode into two episodes. The episode begin date for the later of the two new episodes is set to the effective-begin date of the effective-time earliest row in that new episode.

FIG. 24 shows the same contents, in an extended canonical schema temporal table, as FIG. 11 shows in a canonical schema temporal table. Note that because the two rows in the table are next to one another, they belong to the same episode. Both belong to the episode for OID 2117 which began on January 2008.

FIG. 12 showed the results of completing a temporal insert transaction against a temporal table that uses the canonical schema. FIG. 25 shows the results of completing the same temporal insert transaction against a temporal table that uses the extended canonical schema. Note that since the new row created by the insert transaction is not next to the next earlier row in effective time for that OID, the new row begins a new episode, one with an episode begin date of March 2010.

FIG. 14 showed the results of completing a temporal update transaction against a temporal table that uses the canonical schema. FIG. 26 shows the results of applying the same temporal update transaction against a temporal table that uses the extended canonical schema. Note that the result of the update did not change any episodes. As already explained, temporal updates do not and cannot alter episodes.

FIG. 16c showed the results of completing a temporal delete transaction against a temporal table that uses the canonical schema. FIG. 27 shows the results of applying the same temporal delete transaction against a temporal table that uses the extended canonical schema. As described above, this temporal delete transaction split an episode, the episode for OID 2117 which began on March 2010. Because it split the episode, it introduced a temporal gap into the episode. Consequently, the original episode ended at that temporal gap, and a new episode began immediately after that temporal gap. Now, in current assertion time, the March 2010 episode ends on June 2010, and a new episode for OID 2117 begins on November 2010.

In another scenario, the effective-time period on a temporal delete transaction may align with the effective-time periods of currently asserted rows in the target table with the same OID. In this case, all the rows within the effective-time period of the transaction are withdrawn. If the effective-time latest withdrawn row is not the effective-time last row in an episode, then the remaining rows in that episode constitute a new episode, with a new episode begin date. So all those rows are withdrawn and replaced by rows with assertion-time periods of [Now( )-9999], episode begin dates equal to the effective begin date of the effective-time earliest row in the new episode, and are otherwise identical to the withdrawn rows.

The Use of Episodes.

Episodes improve the performance of temporal referential integrity checks. This is because episodes are the parent managed objects in a temporal referential integrity relationship. In checking temporal referential integrity, the AVF-E does not need to retrieve multiple rows in the parent temporal table for the relationship. It only needs to retrieve the one row whose OID matches the temporal foreign key value of the child row for which the integrity check is being carried out, and whose effective end date is equal to or greater than the effective end date of that child row. On that one parent row, the episode begin date indicates the start of the effective-time extent during which the object referenced by the temporal foreign key is, without any temporal gaps, represented. If the effective begin date of the row for which the check is being carried out is equal to or later than that episode begin date, then the row passes the temporal referential integrity check, and otherwise does not.

In this way, by needing to retrieve only one row from the parent table, the AVF-E can carry out temporal referential integrity checks more efficiently than the AVF can, because the AVF uses the process in which the occupied space of possibly many parent rows must be consulted.

A Circa Flag.

This aspect is for an improvement on previously-described embodiments. The improvement is to substitute an approximately accurate match predicate for a range predicate.

(def) circa effective flag: the approximately accurate match predicate for effective time.

We will not provide figures to illustrate the use of the match predicate, but it constitutes a modification to the canonical schema 600. The match predicate is based on a column we call a circa effective flag. The column can take on one of two values, for example, "0" and "1".

A match predicate that will substitute, in an index, for a range predicate on effective time, cannot be guaranteed accurate at all times. For example, assuming our time periods are accurate to milliseconds, a row may have an effective-time period which will end in three milliseconds. This means that three milliseconds from now, that row will no longer be current. How is a flag to change its value at precisely that split-second moment in time?

The key insight is this. The flag doesn't have to be one-hundred percent accurate to be useful as a match predicate. We design these flags to distinguish between rows whose time periods are known to be in the past from rows whose time periods are not known to be in the past.

When the AVF creates a new row in a temporal table, the effective-time period of that row may be in the past, present or future. If it is in the past, we assign its circa effective flag a value of 0, and otherwise a value of 1.

During some maintenance processes, the AVF may create rows with an effective end date of Now( ). Whenever it does this, it will set the circa effective flag on those rows to 0, meaning that these rows are definitely known to not be currently effective rows.

A temporal transaction may create a current version or a future version of an object which has a non-9999 effective end date. Because the version is not in past effective time, the AVF will set its circa effective flag to 1. But as time goes by, future versions may become current versions, simply because of the passage of time. More to the point, current versions may become past versions, simply because of the passage of time. At the moment a current version slips into the past, its circa effective flag is incorrect. That flag will still be set to 1.

Periodically, an update statement should scan the database looking for rows with effective-time periods in the past but with circa effective flags still set to 1. For each of those rows, it will change their circa effective flag to 0. In this way, the flag will remain approximately correct as a way to distinguish non-current versions from current versions.

This means that queries looking for currently effective data should specify a circa effective flag of 1, as well as a current effective-time period. Temporal indexes that use the circa effective flag instead of an effective begin or end date will have substituted a match predicate for a range predicate. The match predicate will perform much better than the range predicate, and will start the search in the index at a node that will not have, under it, more than a small handful of rows whose effective-time periods are in the past.

Support for Deferred Assertions.

This aspect is for an improvement on previously-described embodiments. The improvement is to add to the functionality of the previous embodiments the ability to manage data which exists in future assertion time.

The improvement requires the addition of one column to the canonical schema 600. As shown in FIG. 28, that column is the row create date 619, and the result is a new canonical schema shown as the deferred assertion canonical schema 624.

Figure 29:
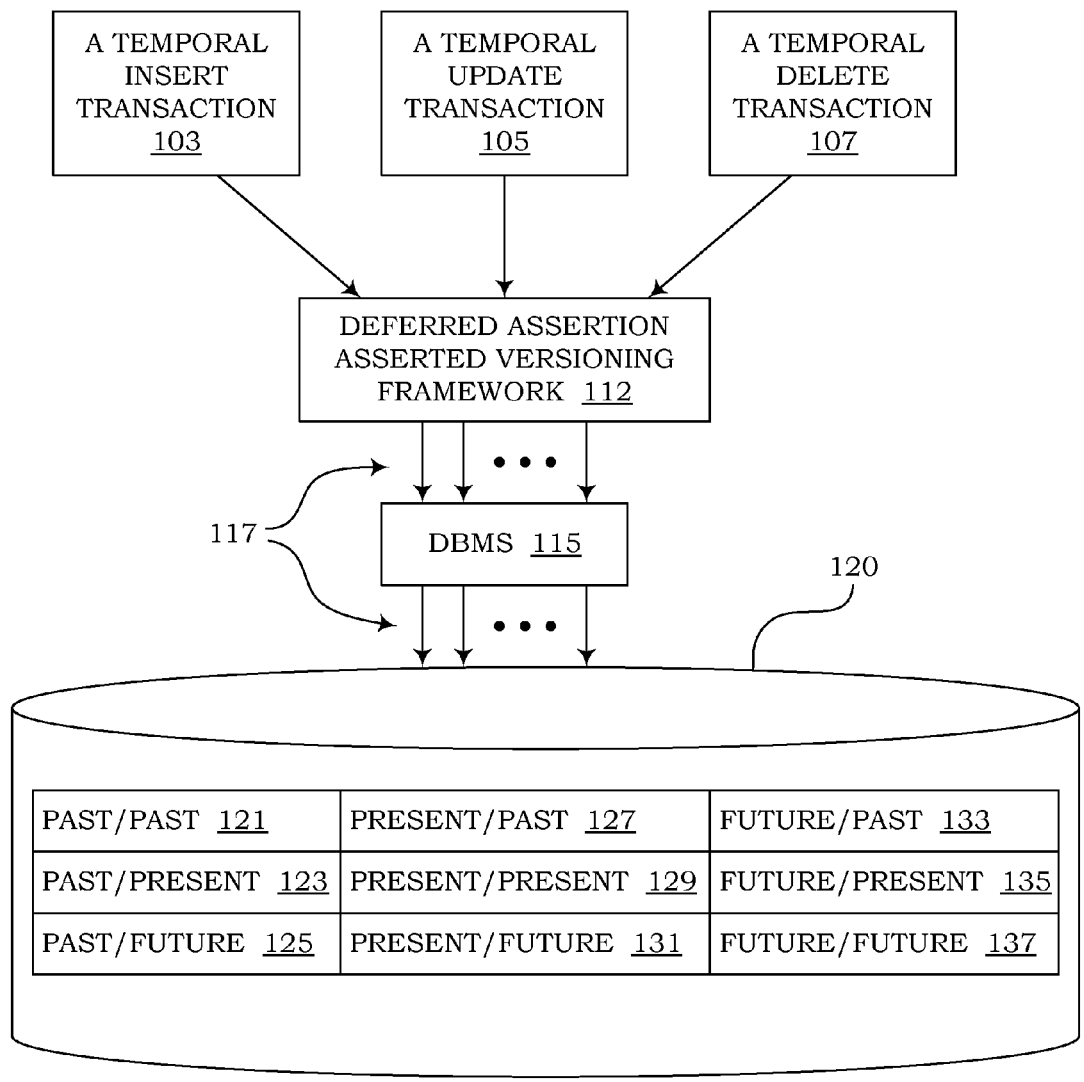
FIG. 29: the architectural context of the invention as extended to support deferred transactions and deferred assertions 133, 135 and 137, by using the deferred assertion Asserted Versioning Framework 112.

With the baseline temporal model, rows inserted into temporal tables begin to be asserted on the date they are physically inserted. This is also true of the AVF 111. With the AVF, assertion dates cannot be specified on temporal transactions, and a default assertion-time period of [Now( )-9999] is always used instead. However, with the deferred assertion Asserted Versioning Framework 112, as shown in FIG. 29, and its use of the deferred assertion canonical schema 624, temporal transactions may be submitted with an explicitly supplied future assertion begin date, and rows may be stored in deferred assertion canonical schema temporal tables 120. These rows will fall into one of three new temporal categories—as shown in FIG. 29, future/past 133, future/present 135 or future/future 137. This is because deferred assertions exist in future assertion time, and may be statements about the effective-time past, present or future of the objects represented by those assertions.

Because rows may now exist in a temporal table whose assertion begin date is not the same as the date on which those rows were physically created, we need the row create date column 619. This will always be the date on which each row is physically created. With this date, we can always recreate exactly what the contents of the table were at any point in time. This ability is the functional equivalent of a physical logfile. A parallel ability is to provide a date and to retrieve only those rows which were currently asserted on that date. This latter ability is the functional equivalent of a semantic logfile, a logfile of what the table asserted to be true at any point in time. It is because of deferred assertions that the physical logfile and semantic logfile functionalities are not identical.

(def) AVF-D: an acronym used as a shortened form of "deferred assertion Asserted Versioning Framework".

The deferred assertion canonical schema temporal table 120 is a temporal table that uses the deferred assertion canonical schema 624.

(def) deferred transaction: a temporal transaction that specifies a future assertion date.

(def) deferred assertion: a row in a deferred assertion canonical schema temporal table with a future assertion begin date.

When the AVF-D creates one or more future assertions as a result of a deferred transaction, those rows will have future assertion-time periods. Those rows will be physically part of the temporal table 120 than contains all other past, present and future assertions for the same object. As previously explained, rows with past assertion-time periods are not currently asserted to make true statements. They are merely records of statements we once asserted were true.

As for these rows with future assertion-time periods, they too are not currently asserted to make true statements. If enough time passes, and these rows are still in their tables 120, and their assertion-time periods become current because of the passage of time, then at that time they will become currently asserted. But until then, they are just a record of what we might eventually come to assert are true statements.

The Near Future and the Far Future.

Deferred transactions may specify any assertion begin date. Some transactions may be given an assertion begin date that is close enough to the present moment that the business will let the deferred assertions they create become current assertions simply by the passage of time. These deferred transactions correspond to transactions that would otherwise be collected together and applied at the end of the day, or perhaps at the end of the week. We will say that such deferred assertions exist in near future assertion time.

(def) near future assertion time: assertion-time periods that are close enough to the present moment that the authors of the deferred transactions that created them are willing to let those deferred assertions become current simply by means of the passage of time.

Other transactions may be given an assertion begin date that is in the distant future, for example, a date several decades from now. The reason for doing this is to avoid the possibility that these assertions might become current if they are ignored or forgotten for long enough. Consequently, these are assertions that will not become current, in any timeframe meaningful to a business, unless explicit action is taken to move them closer in assertion time to the present moment. We will say that such deferred assertions exist in far future assertion time.

(def) far future assertion time: assertion-time periods that are far enough away from the present moment that they will not become current assertions unless or until explicit action is taken to change their assertion time periods to time periods in near future assertion time.

The Business Value of Future Assertions.

One way of looking at rows with future assertion-time periods is to consider a temporal database which does not manage such rows. This might be a temporal database of canonical schema temporal tables 119, managed by the AVF 111. Or it might be a temporal database from the prior art, such as one managed by Oracle 11g and its Workspace Manager.

With such databases, as with conventional databases, we often write transactions that we do not intend to apply to the database right away. Sometimes we intend to apply these transactions in the near future, perhaps at the end of the business day. The collections of these "near future" transactions are often called "batch transaction datasets" or "batch tables". But until they are submitted to the DBMS and applied to their target tables, the rows they contain are statements which are not yet currently asserted in our databases.

With the AVF-D and its deferred assertions, those transactions can be applied right away, and will not become currently asserted until the assertion begin date associated with them becomes current. By this means, this invention eliminates the need to manage external datasets which are collections of written but not-yet applied transactions. It avoids potential bottlenecks that might otherwise be encountered when a very large number of transactions, residing in such external datasets, must be added to the database at the same time.

At other times, we write transactions that we do not intend to apply to the database until a substantial amount of time has passed, for example weeks or months. We keep this data in a collection of tables separate from production databases. Sometimes we call these separate collections of data a "sandbox" area. When we use this term, our intention is usually to "play around" with the data, perhaps to try to develop a new bill of materials for an improved version of a product. If we are successful, and our work is approved, we will then move the data from the sandbox into the production bill of materials table.

But with the AVF-D and its deferred assertions, that "sandbox" bill of materials can exist alongside the "real" bills of materials in the production bill of materials table. By this means, this invention eliminates the need to manage sandboxes of data.

There is another reason we write transactions that we do not intend to apply to the database until a substantial amount of time has passed. It is to accumulate a collection of data from multiple sources. When the first components of the data we need arrive, we start to build the transactions that we will eventually apply to the database. But additional components are needed before those transactions are complete. Eventually, when all the components have arrived, and when all have been combined into complete insert, update and delete transactions, we can apply those transactions to the production database.

In such cases, we do not tend to call the physical datasets in which we accumulate and build our transactions "sandboxes" or "batch transaction tables". More commonly, we call them "staging areas" or "pending tables", places where we get ready for going to production.

But regardless of what we call them, these are all physical objects external to the database tables that they will, unless discarded, eventually update. In all these cases, the AVF-D eliminates the need to manage these external physical objects by permitting us to store batched transactions, sandbox data and staging area data in the same tables as the production data we currently assert as data which makes true statements about the objects represented in those tables. In eliminating these external datasets, this invention eliminates the cost of managing them, the latency involved in getting approved data from them into production tables, and the bottlenecks that may arise when large volumes of such data are approved all at once.

Managing Deferred Transactions and Deferred Assertions.

The series of steps by which the AVF-D manages temporal transactions, and the data in extended canonical schema tables which result from those transactions, is the same series of steps by which the AVF manages temporal transactions, and the data in standard canonical schema tables which result from those transactions, except that the AVF-D manages temporal transactions that may specify future assertion-time periods, and also manages the future assertions, called "deferred assertions", that result from them.

A Deferred Insert Transaction.

Step 701.

This step is identical to the step 701 which the AVF carries out when processing a temporal insert transaction, except that for the AVF-D, an assertion date may be specified on the transaction. If it is, the AVF-D checks that it is a future date.

We again emphasize that, although dates are being used to provide examples for this patent application, in another embodiment these dates might be timestamps or any other datatype that expresses points in time.

Steps 703 and 705.

These steps are identical to the steps 703 and 705 which the AVF carries out when processing a temporal insert transaction, except that the AVF-D will accept a future assertion begin date specified on the transaction. If one is supplied, it will assign the transaction the assertion-time period with that date as its begin date, and 9999 as its end date. Otherwise, the AVF-D will assign the transaction a [Now( )-9999] assertion-time period.

Step 707.

This step is identical to the step 707 which the AVF carries out when processing a temporal insert transaction.

Both the AVF 111 and the AVF-D 112 search a two-dimensional target space, and compare two-dimensional occupied spaces to that target space. And for both of them, the target space always extends, along its assertion-time axis, to 9999, the latest point in time the DBMS can represent. For the AVF, the target space always begins, along its assertion-time axis, at Now( ) i.e. at the moment in time at which the transaction is being processed. But for the AVF-D, when an assertion begin date is supplied on a transaction, the target space will begin, along its assertion-time axis, at some future point in time. However, for both the AVF and the AVF-D, the target space always begins, along its assertion-time axis, at the point in time specified by the assertion begin date of the transaction.

In a temporal database whose temporal tables are canonical schema temporal tables 119, there will be no occupied spaces that begin, along their assertion-time axis, in the future. But in a temporal table whose temporal tables are deferred assertion canonical tables 120, there may be rows whose occupied spaces begin, along their assertion-time axis, in the future.

Nonetheless, a target space is a target space, and an occupied space is an occupied space. And so the means by which the AVF 111 matches occupied spaces to target spaces is the same means by which the AVF-D 112 matches occupied spaces to target spaces.

Step 709.

This step is identical to the step 709 which the AVF carries out when processing a temporal insert transaction.

Step 713.

This step is identical to the step 713 which the AVF carries out when processing a temporal insert transaction.

FIG. 30*b* shows a temporal Policy table which is a deferred assertion canonical schema temporal table 120. It contains two rows, both describing insurance policy P861. The values of Now( ) for the transactions that created each row are shown in the row create dates.

Note that if these rows were contained in a canonical schema temporal table 119, there would be no row create date, and no need for one. Because of the rules by which the AVF 111 processes temporal transactions, the assertion begin date of all rows in tables 119 is the date on which those rows are physically created. But as the second row shown in FIG. 30 illustrates, in tables 120, the AVF-D may create rows whose assertion begin dates are later than the dates on which those rows are physically created.

The first row shown in FIG. 30*a* began to assert, on June 2008, that from that date up to February 2012, our company had a client C457 whose name was Jones. The second row shown in FIG. 30*a* asserts nothing at all when it is first created. But if it is not updated or deleted, then beginning on March 2012, it will become a current assertion on that date, stating that client C457, whose name is Jones, is re-instated beginning on September 2012, and will remain in effect until further notice.

The first row shown in FIG. 30*b* began to assert, on January 2011, that throughout 2011, policy P861 is an HMO policy with a thirty-dollar copay amount. The temporal referential integrity constraint for this row is satisfied by the first row shown in FIG. 30*a*.

The second row shown in FIG. 30*b* asserts nothing at all when it is first created. But if it is not updated or deleted, then beginning on July 2012, it will become a current assertion stating that throughout 2013, the policy will be a PPO policy with a fifty-dollar copay amount. The temporal referential integrity constraint for this row is satisfied by the second row shown in FIG. 30*a*.

A Deferred Update Transaction.

Steps 701, 703 and 705.

These steps are identical to the steps 701, 703 and 705 which the AVF carries out when processing a temporal update transaction, except that for the AVF-D, an assertion begin date may be specified on the transaction. If it is, the AVF-D checks that it is a future date.

Steps 707 and 709.

These steps are identical to the steps 707 and 709 which the AVF carries out when processing a temporal update transaction.

Step 713.

This step is identical to the step 709 which the AVF carries out when processing a temporal update transaction. It is interesting to note, however, that one of the ways in which a TRI check can fail in a temporal database managed by the AVF-D and consisting of deferred assertion canonical schema temporal tables 120 is not possible in a temporal database managed by the AVF and consisting of canonical schema temporal tables 119. For when deferred assertions may exist in temporal tables, it is possible that a TRI check will fail because the parent occupied space begins at a later point along the assertion-time axis than does the target space of the transaction. In other words, in such a situation, there may be a set of rows with an OID that matches the TFK on a transaction, and whose effective-time periods fully include the effective-time period on the transaction, but a set of rows at least one of which will not have an assertion begin date equal to or earlier than the assertion begin date of the transaction.

Step 753.

This step is identical to the step 753 which the AVF carries out when processing a temporal update transaction. But there is an interesting point of difference in the data that is managed.

Using the AVF 111, to withdraw a row is to change its assertion end date to Now( ), i.e. to the point in time at which the transaction is being processed. Semantically, this means that from Now( ) on, the withdrawn row will no longer be asserted as making a true statement about the object it represents.

However, using the AVF-D 112, to withdraw a row is to change its assertion end date to the assertion begin date specified on the transaction. Since, if specified, that date is a future date, this means that until that future date becomes current, the withdrawn row will remain currently asserted. It will retain its status as a row which we claim is making a true statement.

But in spite of this difference, the AVF and the AVF-D use the same process to withdraw a row. In both cases, the assertion begin date specified on the temporal transaction is used as the assertion end date for the withdrawal.

A temporal update, whether deferred or not, will always result in the AVF-D changing the assertion end date of the row or rows within the target space of the transaction to the assertion begin date of the transaction. When a temporal update is not a deferred transaction, that assertion date is the value of Now( ). And so as soon as the transaction is complete, the row or rows so updated will have been withdrawn into past assertion time.

But when a temporal update is a deferred transaction, that assertion date is a future date. And so as soon as the transaction is complete, the row or rows so updated will remain in current assertion time, but will be in an assertion-time period with a definite non-9999 end date.

(def) closed assertion-time period: an assertion-time period with a non-9999 end date.

Just as rows with past assertion-time periods cannot be the target of temporal update or temporal delete transactions, the AVF-D will manage all other rows with closed assertion-time periods in the same way. We will say that all rows with closed assertion-time periods are locked from transactions with an earlier transaction assertion date.

(def) locked: a row in a temporal table is locked if and only if it cannot be the target of any temporal transaction.

When the target of a deferred update transaction is a row in current assertion time, the result of the transaction is that the target row takes on a locked current assertion-time period. But a deferred update transaction may have as a target another deferred assertion. When it does, the result of the transaction is that the target row takes on a locked future assertion-time period.

It follows as a corollary that temporal update and delete transactions, whether or not deferred, can only have unlocked rows as their targets.

It is necessary to lock rows with closed current assertion-time periods and closed future assertion-time periods because this locking is a serialization mechanism. Conventional update or delete transactions are applied to the state of the database current when those transactions are applied. Non-deferred temporal update or delete transactions are also applied to the state of the database current when those transactions are applied.

But deferred temporal update or delete transactions leave their target rows in either current or future assertion time. And so if those target rows could, by means of later transactions, be again temporally updated or be temporally deleted, that would alter the state of the database to which those original deferred transactions were applied. But because the semantic validity of update and delete transactions depends on the state of the database to which they are applied, that cannot be allowed to happen. The way the AVF-D prevents that from happening is by means of the non-9999 assertion end date on all rows temporally updated or temporally deleted by means of deferred transactions, which the AVF-D interprets as functionally equivalent to a lock on those rows.

Steps 755 757, 759, 761 and 763.

These steps are identical to the steps 755, 757, 759, 761 and 763 which the AVF carries out when processing a temporal update transaction, keeping in mind that while the assertion begin date on a temporal transaction submitted to the AVF 111 is always Now( ) the assertion begin date on a temporal transaction submitted to the AVF-D 112 may be either Now( ) or some future point of time.

As already noted, all the physical updates and physical inserts required to complete a temporal update transaction are managed by the AVF-D as an atomic and isolated unit of work. If any of those physical transactions fails, the AVF-D will direct the DBMS to undo any earlier physical transactions that are part of that unit of work.

FIG. 31 shows the results of applying a deferred temporal update transaction, on May 2012, to the policy data shown in FIG. 30*b*. The transaction specified that, starting on September 2012, the database should assert that during the first half of 2013, policy P861 will have a copay amount of forty-dollars, and that during the second half of 2013, it will have a copay amount of fifty-dollars.

Until September 2012, the database will continue to assert that the policy will have a copay amount of fifty-dollars throughout 2013. And starting on May 2012, the second row shown in FIG. 31 is locked, and cannot be the target of any other temporal insert or temporal delete transaction.

No other rows in the target table were wholly or partially within the target space of the transaction, and so the transaction was complete at that point in time. The atomic and isolated unit of work was complete, and all DBMS locks used in the process were released.

Moving Assertions Around in Future Assertion Time.

In most cases, deferred assertions are moved from a far future to a near future period of assertion time. Doing this will reflect a business decision in which rows in far future assertion time have been reviewed, and a decision has been made to assert them. By bringing them into near future assertion time, a possibly large and inter-related group of such rows will then all become currently asserted at the same moment in time.

FIG. 32*a* shows the same data as that shown in FIG. 30*b*, but with the assertion date for the 2013 effective time year changed to 2090, a far future assertion date. FIG. 32*b* shows a deferred update to the 2013 effective time year, which is the same update as that made in near future assertion time and shown as FIG. 31. As with the near future update, this one also locks the row it is updating by setting that row's assertion end date to the same value as its own assertion begin date. In this example, that value is the far future date 2093.

FIG. 32*c* shows the results of moving the unlocked far future deferred assertions into near future assertion time. The third and fourth rows in FIG. 32*b* were the only unlocked deferred assertions. FIG. 32*c* shows those rows moved into near future assertion time by having their assertion begin dates physically updated from July 2093 to June 2012.

The physical update does destroy the information that when, originally entered, these rows were given an assertion begin date of 2093. In this embodiment of the management of deferred assertions, our design philosophy is that until deferred assertions become current assertions, they do not represent any statements that the business has committed itself to. For that reason, we do not believe that it is important to preserve such changes made to never yet made assertions.

If no changes were made to the second row in FIG. 32*c*, then, in one embodiment, that row would remain with an assertion time period of [July90-July93]. In that case, some eighty years from now, that row would, contrary to all intentions and expectations, become currently asserted. Also, the third and fourth rows, having been moved to the [June12-9999] assertion time period, also exist in the [July90-July93] assertion time period. Those two rows are rows for policy P861 for the 2013 effective-time period. But the second row is also a row representing the 2013 effective-time period of the same policy, and so if no changes were made to that row, the result would be a TEI conflict.

For this reason, the AVF-D must either remove the second row from assertion time so that there is no TEI conflict, or else block the move. If the move is blocked, then the AVF-D will return an error message. In that case, before the third and fourth rows could be moved, the second row would have to be removed from its earlier assertion time period. If the move is not blocked, then the move will "cross over" the second row, thereby introducing the third and fourth rows into the assertion period of the second row, creating a TEI conflict. To avoid the conflict, whenever such a move does "cross over" another deferred assertion for the same object in the same or in overlapping effective-time periods, the row or rows "crossed over" will have their assertion end dates set to the near future assertion time which is also being used as the assertion begin dates of the rows doing the "crossing over". The result is always to place the "crossed over" rows into negative assertion time.

In this example, when the third and fourth rows have been moved by being given a June 2012 assertion begin date, the second row is placed into "negative assertion time" by being given that same date as its assertion end date. That second row then exists in the assertion-time period of [July90-June12], i.e. in no assertion-time period at all. The TEI conflict has been avoided.

(def) negative assertion-time period: an assertion-time period whose end date is earlier than its begin date, created in the process of moving later deferred assertions for the same object and effective-time period "across" the assertion-time period of the row. This row could be deleted.

In the example just reviewed, we chose to currently assert the statements that policy P861 had a forty-dollar copay in the first half of 2013, and a fifty-dollar copay in the second half of the year. But the earlier deferred assertion stated that P861 had a fifty-dollar copay throughout all of 2013. If the business had decided to make that assertion represented by the second row current, rather than the assertions made by the third and fourth rows, how would that have been done?

In one embodiment of the AVF-D, nothing would have been done. The later deferred assertions would remain unaffected. In another embodiment, the same process would be used. In that case, the result would be the table shown in FIG. 32d. The second row would become currently asserted, and the third and fourth rows would be moved into negative assertion time.

Finally, we note that throughout the management of these far future deferred assertions, TRI constraints have remained satisfied. As FIG. 30a shows, the client referenced by the TFK of these policy rows was asserted to exist throughout the 2013 effective-time period, starting on March 2012.

A Circa Flag.

This aspect is for an improvement on previous embodiments.

The improvement is to substitute an approximately accurate match predicate for a range predicate.

(def) circa assertion flag: the approximately accurate match predicate for assertion time.

We will not provide figures to illustrate the use of the match predicate, but it constitutes a modification to the deferred assertion canonical schema 624. The match predicate is based on a column we call a circa assertion flag. The column can take on one of two values, e.g. "0" and "1".

The circa assertion flag works for assertion time exactly like the circa effective flag works for effective time. It is used with the deferred assertion canonical schema 624 because it is only when deferred assertions may exist in a temporal table that we can have assertions in future time which may, because of the passage of time, become past assertions, and assertions in current time which have a non-9999 assertion end date and therefore may become past assertions. This is the precise situation that parallels the process in which a row currently in effect may, because of the passage of time, become a row in past effective time. In both cases, a periodic update process must scan the database, and correct the circa flags. In addition, the AVF can update the circa flag whenever an assertion end date is set to Now( ). In both cases, specifying the circa flag as well as the time period in a query will allow indexes that use the circa flag instead of the time period to perform a more efficient search of their index trees.

The present disclosure provides:

(1) a computer program product embedded in a computer readable medium for implementing a temporal database supporting valid time data, transaction time data, and bi-temporal data, wherein the improvement comprises:

(1.1) a means for storing temporal data as rows in temporal tables in the temporal database, the tables all using the same canonical schema, the canonical schema comprising, in any order, (1.1.1) at least one surrogate-valued column which, in each row in a temporal table, designates the object identifier of the object which the row represents, (1.1.2) at least one time-valued column which, in each row in a temporal table, designates an effective-time period which indicates, if the effective-time period ended prior to the present moment, a period of time in the past during which the object represented by the row existed in the state described by the atemporal data in that row, and which indicates, if the effective-time period contains the present moment, a current period of time during which the object represented by the row exists in the state described by the atemporal data in that row, and which indicates, if the effective-time period begins after the present moment, a period of time in the future during which the object represented by the row will exist in the state described by the atemporal data in that row, (1.1.3) at least one time-valued column which, in each row in a temporal table, designates an assertion-time period which indicates, if the assertion-time period ended prior to the present moment, a period of time in the past during which the row was asserted to make a true statement about the object which it represents, as that object existed, exists or will exist during the effective-time period designated by that row, and which indicates, if the assertion-time period contains the present moment, a current period of time during which the row is asserted to make a true statement about the object which it represents, as that object existed, exists or will exist during the effective-time period designated by that row, (1.1.4) a business key comprising at least one column which, in each row in the temporal table, designates a unique identifier of the object which the row represents, the at least one column being identical to the at least one column of the primary key of an otherwise identical non-temporal table;

(1.1.5) for each temporal referential integrity relationship between a child temporal table and a parent temporal table, a temporal foreign key comprising at least one column in the child temporal table which, in each row in the child temporal table, contains the OID value of at least one row in the parent temporal table;

(1.2) a means for storing additional data in a temporal table, the additional data comprising zero, one or more business data columns such that each of the one or more business data columns in each row in the temporal table contains data which describes the state of the object represented by the row in which each of the one or more business data columns occurs;

(1.3) a means for applying temporal insert, temporal update, and temporal delete transactions against the temporal database by storing the temporal data resulting from the temporal insert, the temporal update, and the temporal delete transactions as rows in one or more of the temporal tables contained in the temporal database;

(1.4) a means for ensuring that the constraint of temporal entity integrity is enforced during the process of applying the temporal insert transactions, the temporal update transactions and the temporal delete transactions to the temporal database;

(1.5) a means for ensuring that the constraint of temporal referential integrity is enforced during the process of applying the temporal insert transactions, the temporal update transactions and the temporal delete transactions to the temporal database;

(1.6) whereby
- (1.6.1) each statement about an object made by a row with an assertion-time period in the past and an effective-time period in the past, and
- (1.6.2) each statement about an object made by a row with an assertion-time period in the past and an effective-time period in the present, and
- (1.6.3) each statement about an object made by a row with an assertion-time period in the past and an effective-time period in the future, and
- (1.6.4) each statement about an object made by a row with an assertion-time period in the present and an effective-time period in the past, and
- (1.6.5) each statement about an object made by a row with an assertion-time period in the present and an effective-time period in the present, and
- (1.6.6) each statement about an object made by a row with an assertion-time period in the present and an effective-time period in the future, is represented by one row in the same temporal table that contains all other rows making statements about the same object;

(1.7) whereby the value of time-critical access to the statements about an object made by rows in the temporal database is maximized because SQL queries or other code which retrieve rows making the statements from the temporal database will have immediate access to the complete set of all the statements about the object without the need for technical personnel to assemble or otherwise pre-process sets of the rows making those statements from subsets of rows making those statements residing in multiple tables, or from subsets of rows making those statements residing in other datasets constituting logical or physical partitions of the temporal data.

The present disclosure further provides:

(2) The computer program product of (1) above wherein a means for retrieving data from the temporal database comprises a view of a temporal table which includes the effective-time periods of the rows selected, but whose contents are restricted to rows which were asserted at some past point in time, or which are asserted at the current moment in time;

(2.1) whereby business users may seem to be viewing uni-temporal version tables as the data in those tables existed at any specified point in time.

The present disclosure further provides:

(3) The computer program product of (1) above wherein a means for retrieving data from the temporal database comprises a view of a temporal table which includes the assertion-time periods of the rows selected, but whose contents are restricted to rows which were, are, or will be currently in effect at a specified point in effective time, (3.1) whereby business users may seem to be viewing a semantic logfile of all modifications made to data which describes objects as those objects existed, exist, or will exist at some specified past, present, or future point in effective time.

The present disclosure further provides:

(4) The computer program product of (1) above wherein a means for retrieving data from a temporal table comprises a view in which the view may have the same name as the corresponding otherwise identical non-temporal table, the columns are all and only those columns appearing on the otherwise identical non-temporal table, the columns being identical in name to the columns on the otherwise identical non-temporal table, and the content of the view dynamically changing so that, at all times, the content includes all and only those rows with current assertion-time periods and with current effective-time periods;

(4.1) whereby temporal upward compatibility for all queries written against an earlier otherwise identical non-temporal table is supported, the temporal upward compatibility insuring that all the queries will produce the same result sets when run against the temporal table as they would have produced if they had been run against the otherwise identical non-temporal table; and.

(4.2) whereby the program can have the ability to write SQL to retrieve data as of any given assertion point-in-time and any given effective point-in-time, and only retrieve no more than one row per object that was asserted and effective at those two points in time, those two points in time not necessarily different.

The present disclosure further provides:

(5) The computer program product of (1) above wherein a means for creating temporal tables comprises, in any order:
- (5.1) a preliminary data model;
- (5.2) a first set of metadata which comprises a means for identifying one or more precursor tables in a preliminary data model, the first set of metadata comprising, for each identified precursor table, the name of the temporal table for which the precursor table is an otherwise identical non-temporal table;
- (5.3) a second set of metadata which comprises a means for identifying, for each temporal table generated from a precursor table designated in the first set of metadata, each temporal referential integrity relationship in which that temporal table is a child temporal table, and which comprises, for each of the temporal referential integrity relationships, in any order,
  - (5.3.1) a means for identifying the at least one column which is the temporal foreign key which expresses that temporal referential integrity relationship,
  - (5.3.2) a means for identifying the temporal table which is the parent temporal table for that temporal foreign key, the parent temporal table and the child temporal table not necessarily distinct,
  - (5.3.3) a means for designating whether the temporal foreign key is optional or required, and
  - (5.3.4) a means for designating whether a temporal delete transaction applied to one or more rows in the parent temporal table should be, if there are one or more rows in the child temporal table which are temporal referential integrity-related to the one or more rows in the parent temporal table about to be deleted and which are within the target space of that temporal delete transaction,
    - (5.3.4.1) restricted, or
    - (5.3.4.2) processed so that the temporal foreign key in the rows in the child temporal table which are temporal referential integrity-related to the one or more rows in the parent temporal table about to be deleted and which are within the target space of that temporal delete transaction are set null, or
    - (5.3.4.3) processed so that the temporal delete transaction is cascaded to the rows in the child temporal table which are temporal referential integrity-related to the one or more rows in the parent temporal table about to be deleted and which are within the target space of that temporal delete transaction, the cascade to apply recursively;
- (5.4) a third set of metadata which comprises a means for identifying, for each temporal table corresponding to a precursor table identified by the first set of metadata, the columns which comprise the business key of the temporal table, the columns having the same datatype and corresponding, one-for-one and in sequence, to the columns comprising the primary key of the corresponding precursor table;

(5.5) a fourth set of metadata which comprises a means for defining a one-to-one correspondence between the at least one column which comprises a foreign key in a precursor table and the at least one column which comprises the corresponding temporal foreign key in the corresponding temporal table;

(5.6) a means for generating the temporal database from the preliminary data model and the sets of metadata such that for each precursor table which is identified by the first set of metadata, the table generated in the temporal database is a temporal table for which the precursor table from which it has been generated is an otherwise identical non-temporal table;

(5.7) whereby the extensive costs of expressing temporal data requirements in most data models are avoided; and (5.8) whereby no changes are required to the data models of databases some or all of whose tables are converted into temporal tables.

The present disclosure further provides:

(6) The computer program product of (1) above wherein a means for raising the level of abstraction at which temporal data is managed comprises:

(6.1) a means for designating, on every row in a temporal table, the earliest point in effective time which that row shares with a set of other rows representing the same object in the assertion-time period shared with that row, such that the effective-time periods of the rows in that set constitute an unbroken series of points in effective time;

(6.2) whereby in determining whether the constraint of temporal referential integrity will be satisfied by a temporal transaction, the invention can determine an unbroken extent of effective-time within the assertion-time period of any row, the unbroken extent of effective-time beginning with the first point in the unbroken series of points in effective time of the rows in the set, and in which that unbroken extent of effective time ends with the last point in the effective-time period of the row;

(6.3) whereby the performance of the process by which temporal referential integrity is enforced is enhanced.

The present disclosure further provides:

(7) The computer program product of (1) above wherein a means for improving the performance of queries which utilize a temporal index and which request rows of data which exist in current effective time comprises:

(7.1) a match predicate added to the temporal index, the match predicate having, for each row in the temporal table, one of two values, one of the two values indicating that the row is definitely known to have an effective-time period which is in the past, and the other of the two values indicating that the row is not definitely known to have an effective-time period which is in the past;

(7.2) whereby the value of the temporal index to speed up the retrieval of rows of data which have an effective-time period which contains the present moment is enhanced by filtering out known past rows when looking for current rows, in comparison to otherwise identical indexes which employ one or more columns of data which can only be used as range predicates.

The present disclosure further provides:

(8) The computer program product of (1) above wherein a means for creating and maintaining rows in temporal tables which have assertion-time periods in the future comprises:

(8.1) a means for applying deferred temporal insert, deferred temporal update, and deferred temporal delete transactions against the temporal database by storing the temporal data resulting from the deferred temporal insert, the deferred temporal update, and the deferred temporal delete transactions as deferred assertions in one or more of the temporal tables contained in the temporal database, the deferred assertions having an assertion begin date equal to a future point in assertion time specified on the deferred temporal transaction;

(8.2) a means for extending the constraints of temporal entity integrity and temporal referential integrity to apply to temporal data existing in future assertion time;

(8.3) a means for moving deferred assertions nearer in assertion time to the present moment;

(8.4) a means for moving deferred assertions farther in assertion time from the present moment;

(8.5) whereby the deferred assertions are rows of data which will not be claimed to make a true statement unless and until their assertion-time periods becomes current;

(8.6) whereby collections of maintenance transactions waiting to be applied to the temporal database are eliminated, the collections of maintenance transactions including queues managed by asynchronous transaction processing software and also queues which will be released for processing by the DBMS by means of human intervention, the latter queues often called "batch transaction files" or "batch transaction tables"; and (8.7) whereby work-in-progress modifications to one or more sets of assertions in a temporal table, such work-in-progress modifications commonly said to occur in a "staging area" or a "sandbox", are contained in the same physical table as production data and the same physical table that contains all other non-deferred categories of temporal data.

The present disclosure further provides:

(9) The computer program product of (8) above wherein a means for improving the performance of queries which utilize a temporal index and which request rows of data which exist in current assertion time comprises:

(9.1) a match predicate added to the temporal index, the match predicate having, for each row in the temporal table, one of two values, one of the two values indicating that the row is definitely known to have an assertion-time period which is in the past, and the other of the two values indicating that the row not definitely known to have an assertion-time period which is in the past;

(9.2) whereby the value of the temporal index to speed up the retrieval of rows of data which have an assertion-time period which contains the present moment is enhanced by filtering out known past rows when looking for current rows, in comparison to otherwise identical indexes which employ one or more columns of data which can only be used as range predicates.

We claim:

1. A computer program embodied in a computer-readable storage medium for managing temporal data, the computer program comprising:

logic adapted to store temporal data in at least one temporal table, the at least one temporal table being stored in a temporal database, each temporal table using a single canonical schema that includes, in any order:

at least one surrogate-valued column that designates an object identifier of an object represented in a row of the respective temporal table; and at least one time-valued column that designates an effective-time period that indicates:

a period of time in the past during which the object represented by the row existed in the state described by business data in the row, if the effective-time period ended prior to a present moment, a current period of time during which the object represented by the row exists in the state described by the business data in the row, if the effective-time period contains the present moment, and a period of time in the future during which the object represented by the row will exist in the state described by the business data in the row, if the effective-time period begins after the present moment;

logic adapted to store additional data in the at least one temporal table, the additional data comprising at least one business data column such that each business data column in each row in the temporal table contains data that describes the state of the object represented by the row in which each business data column occurs; and logic adapted to create temporal tables, the logic adapted to create temporal tables including, in any order:

a preliminary data model;

a first set of metadata that enables identification of one or more precursor tables in the preliminary data model, the first set of metadata comprising, for each identified precursor table, the name of the temporal table for which the precursor table is an otherwise identical non-temporal table;

a second set of metadata that enables identification of, for each temporal table generated from a precursor table designated in the first set of metadata, each temporal referential integrity relationship in which that temporal table is a child temporal table, the second set of metadata comprising, for each of the temporal referential integrity relationships, in any order:

logic adapted to identify the at least one column having the temporal foreign key that expresses the temporal referential integrity relationship;

logic adapted to identify a parent temporal table for the temporal foreign key;

logic adapted to designate whether the temporal foreign key is optional or required; and logic adapted to designate whether a temporal delete transaction applied to one or more rows in the parent temporal table should be, if there are one or more rows in the child temporal table that are temporal referential integrity-related to the one or more rows in the parent temporal table about to be deleted and which are within the target space of that temporal delete transaction, restricted, or processed so that the temporal foreign key in the rows in the child temporal table that are temporal referential integrity-related to the one or more rows in the parent temporal table about to be deleted and which are within the target space of that temporal delete transaction are set null, or processed so that the temporal delete transaction is cascaded to the rows in the child temporal table which are temporal referential integrity-related to the one or more rows in the parent temporal table about to be deleted and which are within the target space of that temporal delete transaction, the cascade to apply recursively;

a third set of metadata that enables identification of, for each temporal table corresponding to a precursor table identified by the first set of metadata, the columns that include the business key of the temporal table, the columns having the same datatype and corresponding, one-for-one and in sequence, to the columns comprising the primary key of the corresponding precursor table;

a fourth set of metadata that defines a one-to-one correspondence between the at least one column that includes a foreign key in a precursor table and the at least one column which comprises the corresponding temporal foreign key in the corresponding temporal table; and logic adapted to generate the temporal database from the preliminary data model and the sets of metadata such that for each precursor table that is identified by the first set of metadata, the table generated in the temporal database is a temporal table for which the precursor table from which it has been generated is an otherwise identical non-temporal table;

whereby a cost to express temporal data requirements in data models is reduced; and whereby no changes are required to the data models of databases some or all of whose tables are converted into temporal tables.

2. The computer program of claim 1, wherein the canonical schema is implemented as a data structure within a Database Management System and is not visible to a database user.

3. A computer program embodied in a computer-readable storage medium for managing temporal data, the computer program comprising:

logic adapted to store temporal data in at least one temporal table, the at least one temporal table being stored in a temporal database, each temporal table using a single canonical schema that includes, in any order:

at least one surrogate-valued column that designates an object identifier of an object represented in a row of the respective temporal table; and at least one time-valued column that designates an effective-time period that indicates:

a period of time in the past during which the object represented by the row existed in the state described by business data in the row, if the effective-time period ended prior to a present moment, a current period of time during which the object represented by the row exists in the state described by the business data in the row, if the effective-time period contains the present moment, and a period of time in the future during which the object represented by the row will exist in the state described by the business data in the row, if the effective-time period begins after the present moment;

logic adapted to store additional data in the at least one temporal table, the additional data comprising at least one business data column such that each business data column in each row in the temporal table contains data that describes the state of the object represented by the row in which each business data column occurs;

logic adapted to create and maintain rows in temporal tables that have assertion-time periods in the future, the logic adapted to create and maintain rows comprising:

logic adapted to apply deferred temporal insert, deferred temporal update, and deferred temporal delete transactions against the temporal database by storing the temporal data resulting from the deferred temporal insert, the deferred temporal update, and the deferred temporal delete transactions as deferred assertions in one or more of the temporal tables contained in the temporal database, the deferred assertions having an assertion begin date equal to a future point in assertion time specified on the deferred temporal transaction;

logic adapted to extend the constraints of temporal entity integrity and temporal referential integrity to apply to temporal data existing in future assertion time;

logic adapted to move deferred assertions nearer in assertion time to the present moment; and logic adapted to move deferred assertions farther in assertion time from the present moment;

wherein the deferred assertions are rows of data that will not be claimed to make a true statement unless and until their assertion-time periods become current;

logic adapted to manage collections of maintenance transactions by asynchronous transaction processing; and logic adapted to contain work-in-progress modifications to one or more sets of assertions in a temporal table in the same physical table as production data and the same physical table that contains other non-deferred categories of temporal data; and logic adapted to improve performance of queries that utilize a temporal index and that request rows of data that exist in current assertion time, the logic adapted to improve the performance of queries comprising:

a match predicate added to the temporal index, the match predicate having, for each row in the temporal table, one of two values, one of the two values indicating that the row has an assertion-time period that is in the past, and the other of the two values indicating that the row is not known to have an assertion-time period that is in the past; and logic adapted to enhance the retrieval of rows of data that have an assertion-time period containing the present moment, wherein the value of the temporal index to speed up is enhanced by filtering out known past rows when looking for current rows, in comparison to otherwise identical indexes that employ one or more columns of data that can only be used as range predicates.

4. The computer program of claim 3, wherein the canonical schema is implemented as a data structure within a Database Management System and is not visible to a database user.

5. A computer program for managing temporal data, embodied in a computer-readable storage medium, the computer program comprising:

logic adapted to store temporal data in at least one temporal table, the at least one temporal table being stored in a temporal database, each temporal table using a canonical schema that includes, in any order:

at least one surrogate-valued column that designates a unique object identifier of an object represented in a row of the at least one temporal table;

at least one time-valued column that designates a valid-time period that indicates:

a period of time in the past during which the object represented by the row existed in a prior state, if the valid-time period ended prior to a present moment, a current period of time during which the object represented by the row exists in a current state, if the valid-time period contains the present moment, and a period of time in the future during which the object represented by the row will exist in a future state, if the valid-time period begins after the present moment; and at least one time-valued column that designates a transaction-time period that indicates:

a period of time in the past during which the row was designated to be correct, if the transaction-time period ended prior to the present moment, and a current period of time during which the row is designated to be correct, if the transaction-time period contains the present moment, the canonical schema including a same set of columns for supporting the creation and management of data in at least one of valid-time, transaction-time, and bi-temporal time.

6. The computer program of claim 5, wherein the canonical schema further comprises a business key having at least one column which, in each row in the temporal table, designates a unique identifier of the object which the row represents, the at least one column being identical to the at least one column of the primary key of an otherwise identical non-temporal table.

7. The computer program of claim 5, wherein the canonical schema further comprises, a temporal foreign key, for each temporal referential integrity relationship between a child table and a parent table, having at least one column in the child table which, in each row in the child table, contains the object identifier value of at least one row in the parent table; and logic adapted to store temporal data in the at least one temporal table that utilizes the temporal foreign key to enforce the constraint of temporal referential integrity when insert transactions, update transactions, and delete transactions are applied to the temporal tables.

8. The computer program of claim 5, further comprising logic adapted to ensure that the constraint of temporal entity integrity is enforced during the process of applying insert transactions, update transactions and delete transactions to the at least one temporal table.

9. The computer program of claim 5, wherein the canonical schema includes:

logic adapted to track an episode, the episode being a period of continuous valid-time determined by monitoring a temporal column designating the earliest point in valid-time that a first row in a temporal table shares with a group of at least one or more other rows in the temporal table, the other rows representing the same object, in which the transaction-time period of the other rows in the group include the transaction-time period of the first row, and in which the valid-time periods of the other rows in the group are earlier than the valid-time period of the first row; and logic adapted to determine whether the constraint of temporal referential integrity will be satisfied by a transaction by ensuring, that there exists, for every row with a non-null temporal foreign key, an episode of the parent object designated by the temporal foreign key whose valid-time period at least fully includes the valid-time period of the row containing the temporal foreign key, and by ensuring the transaction-time period of each of the rows in the episode at least includes the transaction-time period of the row containing the temporal foreign key.

10. The computer program of claim 5, wherein the canonical schema assigns:

a default valid-time period to rows arising from insert, update, and delete transactions in tables where valid-time periods are not designated, and a default transaction-time period to rows arising from insert, update, and delete transactions in tables where transaction-time periods are not designated.

11. The computer program of claim 5, wherein the canonical schema further comprises business data other than a business key.

12. The computer program of claim 5, wherein the canonical schema is implemented as a data structure within a Database Management System and is not visible to a database user.

13. The computer program of claim 5, further comprising logic adapted to:
   store temporal data in the at least one temporal table, wherein the temporal data comprises at least one future transaction-time row, and
   extend the constraints of at least one of temporal entity integrity and temporal referential integrity to rows in temporal tables containing future transaction-time periods.

14. The computer program of claim 5, wherein the logic to store temporal data in the at least one temporal table is adapted to generate a view of selected rows from the at least one temporal table, the view including the valid-time period and the contents of the view restricted to rows where the transaction-time period includes a designated point in time.

15. The computer program of claim 5, wherein the logic to store temporal data in the at least one temporal table is adapted to generate a view of selected rows in the at least one temporal table, the view including the transaction-time period and the contents of the view restricted to rows where the valid-time period includes a designated point in time.

16. The computer program of claim 5, wherein the logic to store temporal data in the at least one temporal table is adapted to generate a view from the at least one temporal table that does not include one or more columns representing a valid-time period and does not include one or more columns representing a transaction-time period, the view dynamically changing to always include only rows with current valid-time periods and with current transaction-time periods, where the view has the same name as an otherwise identical non-temporal table for the temporal table from which the view is generated, the columns of the view are identical to the columns appearing on the otherwise identical non-temporal table, and the columns of the view are identical in name to the columns in the otherwise identical non-temporal table.

17. The computer program of claim 5, further comprising logic adapted to:
   store temporal data in the at least one temporal table, wherein the temporal data comprises at least one future transaction-time row, and
   extend the constraints of at least one of temporal entity integrity and temporal referential integrity to rows in temporal tables containing future transaction-time periods.

18. The computer program of claim 13, further comprising logic adapted to ensure that all rows representing the same object exist in the same temporal table.

* * * * *